US011768495B2

(12) United States Patent
Blake et al.

(10) Patent No.: US 11,768,495 B2
(45) Date of Patent: Sep. 26, 2023

(54) PATH PLANNING IN MOBILE ROBOTS

(71) Applicant: Five AI Limited, Bristol (GB)

(72) Inventors: Andrew Blake, Bristol (GB); Subramanian Ramamoorthy, Bristol (GB); Svetlin-Valentinov Penkov, Bristol (GB); Majd Hawasly, Bristol (GB); Francisco Maria Girbal Eiras, Bristol (GB); Alejandro Bordallo Mico, Bristol (GB); Alexandre Oliveira E. Silva, Bristol (GB)

(73) Assignee: Five AI Limited, Cambridge (GB)

(*) Notice: Subject to any disclaimer, the term of this patent is extended or adjusted under 35 U.S.C. 154(b) by 341 days.

(21) Appl. No.: 16/976,053

(22) PCT Filed: Feb. 27, 2019

(86) PCT No.: PCT/EP2019/054910
§ 371 (c)(1),
(2) Date: Aug. 26, 2020

(87) PCT Pub. No.: WO2019/166517
PCT Pub. Date: Sep. 6, 2019

(65) Prior Publication Data
US 2021/0191404 A1 Jun. 24, 2021

(30) Foreign Application Priority Data

Feb. 18, 2018 (GB) .................................. 1803292

(51) Int. Cl.
*G05D 1/02* (2020.01)
*B60W 60/00* (2020.01)
*G06V 20/58* (2022.01)

(52) U.S. Cl.
CPC ....... *G05D 1/0214* (2013.01); *B60W 60/0011* (2020.02); *B60W 60/0027* (2020.02);
(Continued)

(58) Field of Classification Search
CPC .. G05D 1/0214; G05D 1/0238; G05D 1/0253; G05D 2201/0213; B60W 60/0011;
(Continued)

(56) References Cited

U.S. PATENT DOCUMENTS

2005/0216181 A1* 9/2005 Estkowski ............. G08G 1/164
340/995.23

FOREIGN PATENT DOCUMENTS

EP 1733287 B1 1/2010

OTHER PUBLICATIONS

Guibas, Leonidas J., et al. "Bounded uncertainty roadmaps for path planning." Algorithmic foundation of robotics VIII. Springer, Berlin, Heidelberg, 2009. 199-215. (Year: 2009).*
(Continued)

*Primary Examiner* — Russell Frejd
*Assistant Examiner* — Ana D Thomas
(74) *Attorney, Agent, or Firm* — GREENBERG TRAURIG, LLP; Andrew J. Tibbetts

(57) ABSTRACT

The invention provides a computer-implemented method of planning a path for a mobile robot such as an autonomous vehicle in the presence of K obstacles. The method uses, for each of the K obstacles, a shape Bk and a density function pk(x) representing the probabilistic position of the obstacle. The method repeats the following steps for at least two different paths A: —choosing a path A, where A is the swept area of the robot within a given time interval; and—calculating based on the density function of each obstacle and the swept path an upper bound on the total probability of at least one collision $F_D$ between the robot and the K obstacles. This allows a number of candidate paths to be ranked for safety. By precomputing factors of the computational steps over K obstacles, the computation per path is O(N), and not O(NK). A safety threshold can be used to filter out paths below that
(Continued)

threshold. An operating path to control the robot can be selected from the remaining paths, optionally based on other factors such as comfort or efficiency.

20 Claims, 13 Drawing Sheets

(52) U.S. Cl.
CPC ......... *G05D 1/0238* (2013.01); *G05D 1/0253* (2013.01); *G06V 20/58* (2022.01); *B60W 2554/4042* (2020.02); *B60W 2554/4043* (2020.02); *G05D 2201/0213* (2013.01)

(58) Field of Classification Search
CPC ..... B60W 60/0027; B60W 2554/4042; B60W 2554/4043; G06V 20/58
See application file for complete search history.

(56) References Cited

OTHER PUBLICATIONS

Guibas, Leonidas J., et al. "Bounded uncertainty roadmaps for path planning." Algorithmic foundation of robotics VIII. Springer, Berlin, Heidelberg, 2009. 199-215. (Year: 2009) (Year: 2009).*
Fulgenzi, Chiara, et al. "Probabilistic navigation in dynamic environment using rapidly-exploring random trees and Gaussian processes." 2008 IEEE/RSJ International Conference on Intelligent Robots and Systems. IEEE, 2008. (Year: 2008).*
Miura, Jun, Hiroshi Uozumi, and Yoshiaki Shirai. "Mobile robot motion planning considering the motion uncertainty of moving obstacles." IEEE SMC'99 Conference Proceedings. 1999 IEEE International Conference on Systems, Man, and Cybernetics (Cat. No. 99CH37028). Vol. 4. IEEE, 1999. (Year: 1999).*
J. Miura and Y. Shirai, "Modeling motion uncertainty of moving obstacles for robot motion planning," Proceedings 2000 ICRA. Millennium Conference. IEEE International Conference on Robotics and Automation. Symposia Proceedings (Cat. No.00CH37065), pp. 2258-2263 vol.3, doi: 10.1109/ROBOT.2000.84636 (Year: 2000).*
PCT/EP2019/054910, Jun. 7, 2019, International Search Report and Written Opinion.
International Search Report and Written Opinion for International Application No. PCT/EP2019/054910 dated Jun. 7, 2019.
Fulgenzi et al., Risk based motion planning and navigation in uncertain dynamic environment. HAL. Oct. 19, 2010:p. 1-14.
Guibas et al., Bounded uncertainty roadmaps for path planning. Springer, Proceedings 2008 International Workshop on the Algorithmic foundations of robotics VIII. Jan. 1, 2009:199-215.
Missiuro et al., Adapting probabilistic roadmaps to handle uncertain maps. Proceedings 2006 IEEE International Conference on Robotics and Automation, 2006. ICRA 2006. May 15, 2006:1261-1267.
Althoff et al., Model-based probabilistic collision detection in autonomous driving. IEEE Transactions on Intelligent Transportation Systems. Apr. 28, 2009;10(2):1-11.
Axelrod et al., Provably safe robot navigation with obstacle uncertainty. The International Journal of Robotics Research. Dec. 2018;37(13-14):1760-74.
Behar et al., Extracting the Minkowski sum boundary from the reduced convolution. 20th Annual Fall Workshop on Computational Geometry. Oct. 2010:4 pages.
Bevilacqua et al., Reactive planning for assistive robots. IEEE Robotics and Automation Letters. Apr. 2018;3(2):1276-83.
Coue et al., Bayesian occupancy filtering for multitarget tracking: an automotive application. The International Journal of Robotics Research. Jan. 2006;25(1):19-30.
Gal et al., Dropout as a bayesian approximation: Representing model uncertainty in deep learning. International conference on machine learning, PMLR. Jun. 11, 2016:1050-1059.
Kalra et al., Driving to Safety. Rand corporation Report RR1478. 2016:1-15.
Katrakazas et al., Real-time motion planning methods for autonomous on-road driving: State-of-the-art and future research directions. Transportation Research Part C: Emerging Technologies. Nov. 1, 2015;60:416-42.
Kim et al., A novel algorithm for crash detection under general road scenes using crash probabilities and an interactive multiple model particle filter. IEEE Transactions on Intelligent Transportation Systems. Dec. 2014;15(6):2480-90.
Kuwata et al., Real-time motion planning with applications to autonomous urban driving. IEEE Transactions on control systems technology. Jul. 28, 2009; 17(5):1105-18.
Lambert et al., Collision probability assessment for speed control. 2008 11th IEEE Conference on Intelligent Transportation Systems. Oct. 12, 2008:1043-1048.
Lavalle, Rapidly-exploring random trees: A new tool for path planning. Tech Rep. 1998:1-4.
Okuta et al., CuPy: A NumPy-compatible library for NVIDIA GPU calculations. 31st conference on neural information processing systems. Dec. 2017:1-7.
Rios-Martinez et al., Understanding human interaction for probabilistic autonomous navigation using Risk-RRT approach. 2011 IEEE/RSJ International Conference on Intelligent Robots and Systems. Sep. 25, 2011:2014-2019.
Shalev-Shwartz et al., On a formal model of safe and scalable self-driving cars. ArXiv preprint arXiv:1708.06374v6. Oct. 27, 2018;6:1-37.
Trautman et al., Robot navigation in dense human crowds: Statistical models and experimental studies of human—robot cooperation. The International Journal of Robotics Research. Mar. 2015;34(3):335-56.
Urmson et al., Approaches for heuristically biasing RRT growth. Proceedings 2003 IEEE/RSJ International Conference on Intelligent Robots and Systems (IROS 2003). Oct. 27, 2003;2:1178-1183.
Wein, Exact and efficient construction of planar Minkowski sums using the convolution method. European symposium on algorithms. Sep. 11, 2006:1-12.
Zhang et al., How far are we from solving pedestrian detection?. Proceedings of the IEEE conference on computer vision and pattern recognition 2016:1259-1267.
Zhang et al., Towards reaching human performance in pedestrian detection. IEEE transactions on pattern analysis and machine intelligence. Apr. 2018;40(4):973-86.
Ziegler et al., Fast collision checking for intelligent vehicle motion planning. 2010 IEEE intelligent vehicles symposium. Jun. 21, 2010:518-522.

* cited by examiner

PATH PLANNING IN MOBILE ROBOTS

RELATED APPLICATIONS

This application is a national stage filing under 35 U.S.C. § 371 of international application number PCT/EP2019/054910, filed Feb. 27, 2019, which claims the benefit of British application number 1803292.0, filed Feb. 28, 2018.

TECHNICAL FIELD

This disclosure relates to path planning in mobile robots such as autonomous vehicles (AVs).

BACKGROUND

Mobile robotic systems that can autonomously plan their paths in complex environments are becoming increasingly more prevalent. An example of such a rapidly emerging technology is autonomous vehicles that can navigate by themselves on urban roads. Such vehicles must not only perform complex manoeuvres among people and other vehicles, but they must often do so while guaranteeing stringent constraints on the probability of adverse events occurring, such as collision with these other agents in the environments. In one study, it is estimated that publicly deployable autonomous vehicles must achieve less than 1 collision in hundreds of millions of miles driven in order for their maximum failure rates to be established as acceptable.

An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on inputs from the sensor system. A fully autonomous or "driverless" vehicle has sufficient decision-making capability to operate without any input from a human driver. However the term autonomous vehicle as used herein also applies to semi-autonomous vehicles, which have more limited autonomous decision-making capability and therefore still require a degree of oversight from a human driver.

Other mobile robots are being developed, for example for carrying freight supplies in internal and external industrial zones. Such mobile robots would have no people on board. Autonomous air mobile robots (drones) are also being developed. The sensory input available to such a mobile robot can often be noisy. Typically, the environment is perceived through sensors such as based on stereo vision or LiDAR, requiring not only signal processing for smoothing or noise removal, but also more complex "object finding" algorithms, such as for the drivable surface or other agents in the environment.

Uncertainty arises directly from sensor noise, and then indirectly through perception algorithms that detect discrete obstacles or impassable terrain.

The issue of safety in control and motion planning has been investigated from a number of different methodological directions.

In early attempts within the robotics community, treatment of safety was closely associated with the notions of robustness to modelling errors in control theory. In the context of feedback control design, the robust control theory provides techniques to determine the single controller that can simultaneously guarantee a desired performance level for a family of possible target system models. This basic notion can be extended to the case of hybrid nonlinear dynamical systems and optimal control specifications through the concept of reachable sets, which can be computed using techniques such as level set methods. Recent extensions have included the use of Gaussian Process based learning of a robot's internal dynamics model, to enable such reachability computations with physical robots.

Other current approaches consider safety in the context of human-robot interaction, where one is also interested in considerations such as modulating physical forces and human factors associated with the psychology of interaction. The core question of avoiding collision states in motion planning is dealt with in these works through the definition of safe zones and operating envelopes, which are not unlike the reachable sets mentioned above. In many applications, the resulting solutions may be overly conservative—leading to 'frozen robots'. In work drawing on robust optimization and stochastic programming, some researchers have posed the problem of motion planning as one of chance-constrained optimization. Following the above mentioned approaches to robust control, these works use set-bounded models of uncertainty and pose the search for paths as a problem of convex programming. In another recent example, the authors calculate rectangular bounds associated with uncertainty in location of obstacles, to determine the safe space within which RRT (Rapidly Exploring Random Tree) style algorithms can operate. As discussed later, the approach described in the present disclosure will improve upon these computations, particularly in the case of close interactions in tight spaces—such as in urban driving.

Reference is made to papers authored by Christian Laugier, Jorge Rios-Martinez and Anne Spalanzani, who calculate probabilistic risk of collision of mobile robots and utilise this to define a risk guided search such as the Risk-RRT. In a paper entitled "*Understanding human interaction for probabilistic autonomous navigation using Risk-RRT approach*, (IEEE Int. Conf. IROS, 2011.) Laugier et al show that, in the context of posing environmental uncertainty in occupancy grids, integrals over multiple grids, one per obstacle, can be combined non-linearly to compute the total risk of collision.

State of the art object detection algorithms tend to be based on methods that imply a limit on the achievable accuracy and reliability of detections. It is realistic to expect such perception modules to be able to provide a probability distribution over poses of each detected object in the scene. Achieving safe motion planning in such a setting requires the motion planning methods to take into account the probability of unsafe events (such as a collision of the robot with another agent), providing at least approximate assurance regarding the (non-)occurrence of these events.

SUMMARY

The core problem addressed herein is that of safe and computationally efficient motion planning in an imprecisely known environment. In some embodiments, the method receives as input detection of objects in the environment along with probability distributions over pose, such as over their centroid position when the shape model is known. This defines the space within which paths are searched. The first step is to determine the probability of a collision event occurring (i.e., the spatial extent of the robot and the spatial extent of any obstacle having an overlap) along any given path. This core computation may then be used to modify a variety of motion synthesis methods. For instance, the Rapidly Exploring Random Tree algorithm can utilise this probability within the search process. Likewise, a variational formulation of optimal control could include this within the cost term.

In order to navigate an encountered driving scenario safely and effectively, an autonomous vehicle planner needs to be able to plan paths which can enable collision free behaviour or at least determine an upper bound on collision risk. One context of path planning is to implement a manoeuvre in a sequence of manoeuvres which have been determined to be executed in an encountered scenario. The manoeuvre may be implemented by one of a number of candidate paths (or trajectories). The techniques described herein can be used to calculate a bound on the probability of collision which can be used to stratify candidate trajectories according to their degree of risk. Then, within a user-defined threshold for an acceptable level of primary risk, motion synthesis techniques could optimise for secondary criteria such as comfort and efficiency.

According to one aspect of the invention there is provided a computer-implemented method of planning a path for a mobile robot in the presence of K obstacles where K is at least one, comprising:
determining, for each of the K obstacles, a shape Bk and a density function pk(x) representing the probabilistic position of said obstacle;
repeating the following steps for at least two different paths A:
choosing a path A, where A is the swept area of the robot within a given time interval; and
calculating based on the density function of each obstacle and the swept path an upper bound on the total probability of at least one collision $F_D$ between the robot and the K obstacles.

The paths may be ranked based on the upper bound of the total probability of at least one collision.

A path A having the smallest $F_D$, preferably having $F_D=0$, may be selected for navigating the object through the obstacles. Alternatively, a set of paths may be filtered out using a threshold for safety and a path selected from the remaining paths. This could be the safest remaining, or optimised for some other criteria such as comfort or efficiency. When using a threshold, this could be used to discard paths before they enter the ranking process, to avoid unnecessary computation.

In the described embodiments the upper bound is further based on the shape (s) of the obstacles.

In one aspect herein, the computational load for calculating the upper bound for all paths A after the first is independent of the number of obstacles.

Calculating the upper bound may comprise computing the sum of the probability of collision of each obstacle with the autonomous vehicle by computing an integral of the product of a first term depending on the path A and a second term dependent on the number of obstacles and the density function of each obstacle but independent of the path A.

The second term may be calculated in an initial calculation and then the upper bound computed using the calculated second term for each different path.

In one embodiment the method further comprises the step of determining, for each obstacle and each path A, whether its shape $B_k$ lies inside the path A. However in the described embodiments, this step is not needed as the steps of the computation described herein inherently account for that.

In one embodiment, the step of calculating the upper bound $F_D$ includes calculating the integral for the case when the shape $B_K$ lies outside the path $$\int \partial A_o(x) G_o(x)$$

where $\partial A_o$ is the bounding contour of the path A, $\partial A_o(x)$ approximates a delta-function ridge along that contour, and $G_o$ is the second term which does not depend on the path A.

$G_o$ may be calculated as follows:
$G_o = \frac{1}{2} \Sigma_k \partial B_{k,o} * p_k$ where $\partial B_{ko}$ is a delta-function ridge along the bounding contour of the shape $B_K$ of the obstacle K and $p_k$ is a density function representing the probabilistic position of the obstacle at a canonical point in the obstacle.

In one embodiment, the step of calculating the upper bound for the case when the shape $B_K$ lies inside the path comprises computing the integral $\int I_A(x) G(x)$ wherein G is calculated as follows:

$$G = \Sigma_k \lambda_k I_{B_k} * p_k$$

where $Ak=1/area(B_k)$ $I_{BK}$ is the indicator function of the shape $B_k$ of the obstacle k and $p_k$ is a density function representing the probabilistic position of the obstacle at a canonical point of the obstacle.

In certain cases, the shapes Bk are modelled as zero dimensional and the upper bound is given by $$\int I_A(x) G(x)$$

where $$G = \Sigma_k p_k$$

For example, pedestrians may be modelled as point sources.

In one aspect, which significantly educes the computation complexity, the method comprises:
computing at least one path independent function as a combination of the density functions for the obstacles; and
for each of a plurality of candidate paths, determining an upper bound of the total probability of obstacle collision along that path, by integrating the path independent function over the swept area;
wherein the path independent function is independent of the candidate path and the upper bound is computed for each candidate path without recomputing the path independent function.

The upper bound for each candidate path is an upper bound on the sum of individual obstacle collision probabilities along that path, but may be computed without determining any of the individual obstacle collision probabilities, and instead, by integrating the path independent function over the swept area.

The K obstacles may be identified using a perception module based on sensory input available to the mobile robot while mobile in its environment. Alternatively, the perception module may take simulated sensory input to implement the method in an off board simulator.

In this context, simulated input may be real data which has been gathered earlier, but the simulator is not running in real time on the robot.

The step of determining the shape $B_K$ may comprise accessing a shape model for the obstacle.

in another aspect, the invention provides a data processing system configured to plan a path for a mobile robot and comprising a computer and memory holding computer code which when executed by the computer carries out a method as defined above.

The data processing system may be embodied in a simulator, on board or off board the robot.

The invention provides in another aspect a computer program product comprising instructions which, when the program is executed by a computer, cause the computer to carry out a method as defined above.

The invention provides in another aspect a computer-readable storage medium comprising instructions which, when executed by a computer, cause the computer to carry out a method as defined above.

The computer program product may be stored on a computer readable data carrier in non transitory form, or may be embodied in a data carrier signal.

A further aspect of the invention provides a computer implemented method of planning a path for a mobile robot in the presence of K obstacles where K is at least one, the method comprising:
- determining a set of candidate paths, all candidate paths being from a common start point to a common end point;
- providing for each candidate path an upper bound on the total probability of at least one collision between the mobile robot and the K obstacles as a safety parameter; and
- ranking the candidate paths in order of the safety parameter to enable selection of one of the candidate paths from the ranked paths.

A threshold for safety may be received and the ranked candidate paths which do not satisfy the threshold for safety can be deselected. The safety threshold may be received from an external body, such as an insurance company or regulator and programmed into the planner/simulator. It may readily be altered without disturbing the planning method because it is applied as a filter after the paths have been ranked. It guarantees that a minimum safety threshold can be met.

A path selection parameter may then be used to select an operating path from the ranked paths which have not been deselected. The path selection parameter can optimise for comfort or efficiency for example, in a set of paths having a guaranteed minimum safety.

The presence of K obstacles may be carried out by at least one sensor on the robot while mobile in its environment by capturing images and recognising obstacles in the images according to different object recognition classes based on accuracy of recognition.

By using the above method, a minimum threshold for safety is attained by a selected operating path for all object recognition classes of objects captured in the images. It may be improved on for certain object classes, but a minimum may be guaranteed by the techniques herein.

Another aspect of the invention provides a computer implemented method of planning a path for a mobile robot in the presence of K obstacles where K is at least one, the method comprising:
- determining a set of candidate paths, all candidate paths being from a common start point to a common end point;
- receiving a threshold for safety and deselecting candidate paths of the set which do not satisfy the threshold for safety; and
- using a path selection parameters to select an operating path from the candidate paths which have not been deselected.

The method can comprise the step of providing for each candidate path in the set an upper bound on the total probability of at least one collision between the robot and the K obstacles as a safety parameter, and using the safety parameter in comparison with the threshold for safety for deselecting candidate paths.

The path selection parameter can comprise at least one of comfort and efficiency.

A further aspect of the invention provides a computer implemented method of planning a path for a mobile robot in the presence of K obstacles, where K is at least one, wherein each of the K obstacles has a shape model indicating a shape $B_K$ of the obstacle and a density function $P_K(X)$ representing the probabilistic position of said obstacle, the method comprising:
- repeating the following steps for at least two different paths A;
- choosing a path A, where A is a swept area of the robot within a given time interval; and
- calculating based on the density function of each obstacle in the swept path an upper bound on the total probability of at least one collision $F_D$ between the robot and the K obstacles.

A further aspect provides a data processing system configured to plan a path for a mobile robot and comprising a computer and memory holding computer code which when executed by the computer carries out a method As defined above.

The data processing system may be embodied in a simulator external to, or on board the mobile robot.

The invention also provides a computer program product comprising instructions which, when the program is executed by computer, cause the computer to carry out a method as defined above.

BRIEF DESCRIPTION OF FIGURES

For a better understanding of the present invention, and to show how embodiments of the same may be carried into effect, reference is made to the following Figures by way of non-limiting example in which.

DETAILED DESCRIPTION

As mobile robots and autonomous vehicles become increasingly prevalent in human centred environments, there is a need to develop techniques which seek to guarantee collision free behaviour, or at least bound the risk. Perceptual modules which receive sensory input data provide only noisy estimates of objects and it is appropriate to represent the environment probabilistically. Embodiments of the present invention introduce methods of path planning which enable a number of candidate paths to be ranked according to a safety parameter. A Fast Path Risk brackets (FPR) algorithm is described herein which efficiently calculates a bound on the probability of collision which can be used to stratify candidate trajectories according to their degree of risk. Then, within the user-defined threshold for an acceptable level of primary risk, motion synthetic techniques might be utilised to optimise for secondary criteria such as comfort or efficiency.

Embodiments of the present invention provide a number of different novel and useful aspects. One contribution is the use in the FPR algorithm of a 'convolution trick' to factor integrals which are used to compute the bound on the collision risk. As a result, given K obstacles and N candidate paths, the computational load is reduced to O (N+K) compared with conventional techniques at O (NK). According to another aspect, candidate paths may be ranked in order of safety based on the upper bound on the total probability of at least one collision between the robot and K obstacles.

According to another aspect, candidate paths may be filtered (e.g. deselected) on the basis of a user-defined threshold, and then a path selected based on other parameters (for example comfort and efficiency) from the filtered (non-deselected) set.

Example embodiments of the present invention are described in detail below. First so useful context to the invention is described.

Figure 10:
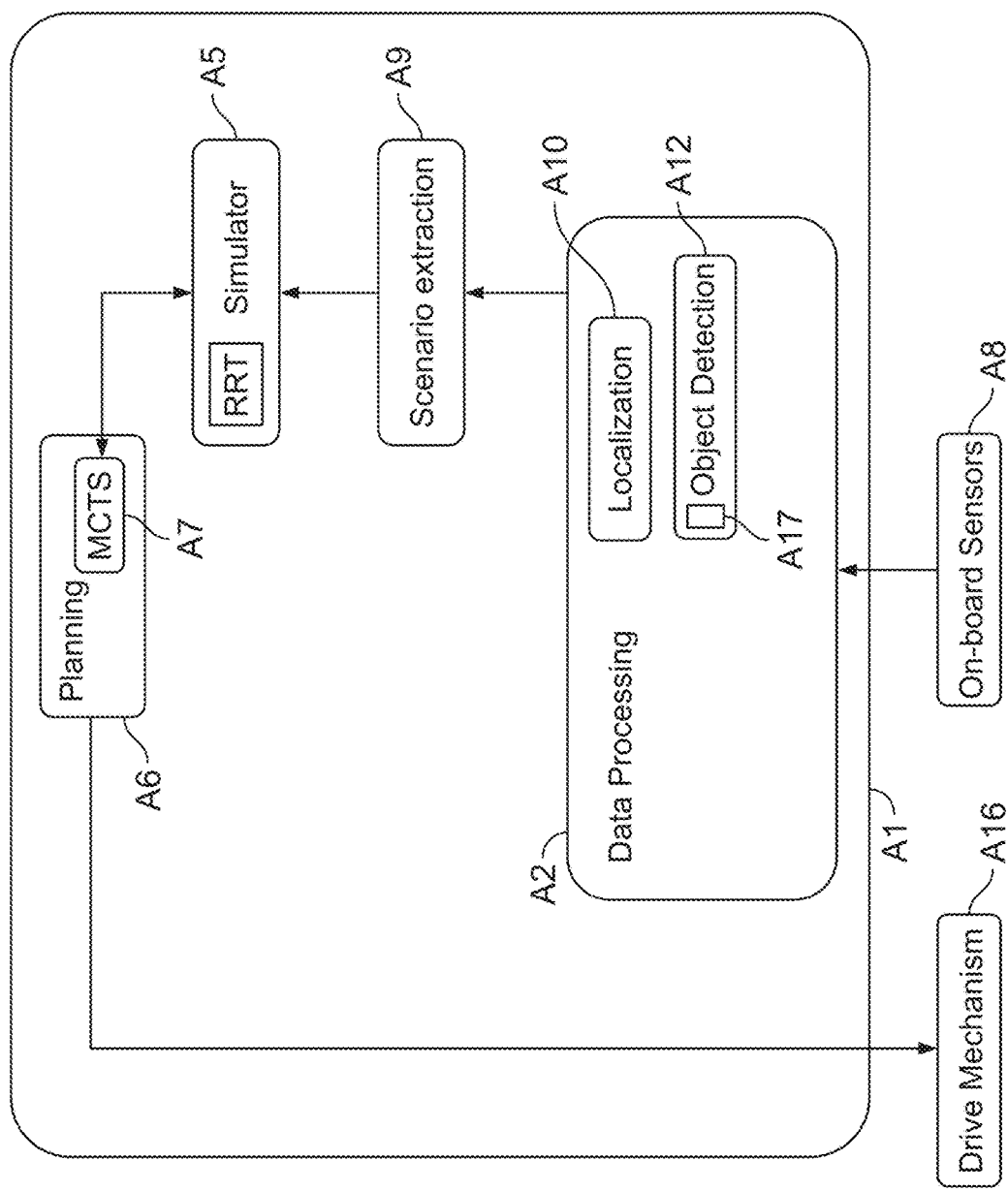
FIG. 10 is a schematic block diagram of an on-board control system for an AV.

FIG. 10 shows a highly schematic functional block diagram of certain functional components embodied in an on-board computer system A1 of an AV (ego vehicle), namely a data processing component A2, simulation component A5 and an AV planner A6. The AV is given as a non-limiting example of a mobile robot.

The data processing component A2 receives sensory input in the form of sensor data from an on-board sensor system A8 of the AV. The on-board sensor system A8 can take different forms but generally comprises a variety of sensors such as image capture devices (cameras), LiDAR units etc., satellite-positioning sensor(s) (GPS etc.), motion sensor(s) (accelerometers, gyroscopes etc.) etc., which collectively provide rich sensor data from which it is possible to extract detailed information about the surrounding environment and the state of the AV and other actors (vehicles, pedestrians etc.) within that environment.

Note however that the present-techniques are not limited to using image data and the like captured using on-board optical sensors (image capture devices, LiDAR etc.) of the AV itself. The method can alternatively or additionally be applied using externally-captured sensor data, for example CCTV images etc. captured by external image capture units in the vicinity of the AV. In that case, at least some of the sensor inputs used to implement the method may be received by the AV from external sensor data sources via one or more wireless communication links. Moreover, the techniques described herein can be implemented off-board, that is in a computer system such as a simulator which is to execute path planning for modelling or experimental purposes. In that case, the sensory data may be taken from computer programs running as part of a simulation stack. In either context, a perception module A17 may operate on the sensor data to identify objects, as part of the data processing system A2.

The data processing system A2 processes the sensor data in order to extract such information therefrom. This will generally involve various forms of machine learning (ML)/artificial intelligence (AI) processing. Functions of the data processing system A2 that are relevant in the present context include localization (block A10) and object detection (block A12).

Localization is performed to provide awareness of the surrounding environment and the AV's location within it. A variety of localization techniques may be used to this end, including visual and map-based localization. By way of example, reference is made to United Kingdom patent Application No. 1812658.1 entitled "Vehicle Localization", which is incorporated herein by reference in its entirety.

Object detection is applied to the sensor data to detect and localize external objects within the environment such as vehicles, pedestrians and other external actors which may contribute obstacles to the AV. This may for example comprise a form of 3D bounding box detection, wherein a location, orientation and size of objects within the environment and/or relative to the ego vehicle is estimated. This can for example be applied to (3D) image data such as RGBD (red green blue depth.), LiDAR point cloud etc. This allows the location and other physical properties of such external actors to be determined on the map. Object detection may be carried out using a perceptual model in a perception module A17. In an on-board context, the perceptual model utilises the received sensor data. In an off-board context the perceptual model may utilise data derived from actual or simulated sensors, pre-stored or generated by a computer program. Perceptual models and their limitations are discussed later.

The AV planner A6 uses the extracted information about the ego's surrounding environment and the external agents within it as a basis for planning path for the AV. The AV planner A6 makes various high-level decisions and then increasingly lower-level decisions that are needed to implement the higher-level decisions. The end result is a series of real-time, low level action decisions. In order to implement those decisions, the AV planner A6 generates control signals, which are input, at least in part, to a drive mechanism A16 of the AV, in order to control the speed and heading of the vehicle (e.g. though steering, breaking, accelerating, changing gear) etc. Control, signals are also generated to execute secondary actions such as signalling.

Similar control signals may be generated in an off-board simulators and supplied to computer programs implementing models of other parts of the AV.

A scenario extraction component A3 determines an encountered driving scenario for the ego vehicle using outputs of the data processing component A2. The determined driving scenario comprises driving scenario parameters which are extracted from the captured sensor data, and which provide a representation of a real-world scenario that has been encountered by the AV that is concise but sufficiently detailed to be used as a basis for realistic simulations.

The simulator A5 receives the parameters of the encountered driving scenario and can run simulations based on those parameters. These are simulations of what might happen in the encountered driving scenario under different assumptions. These simulations are used as a basis for AV planning, in which the AV planner A6 runs multiple simulations with the aim of determining a globally optimal sequence of manoeuvres to be taken in the encountered driving scenario to execute a defined goal (i.e. achieve a desired outcome, such as reaching a particular location on the map). In one example described in our Patent Application No. 1816853.4, the contents of which are incorporated by reference, the simulations are run as part of a Monte Carlo Tree Search (MTCS) executed by a manoeuvre selection component A7 of the AV planner A6.

When the ego vehicle is travelling, it must plan which manoeuvres to perform in order to execute a defined goal.

When the ego vehicle encounters an actual driving scenario it needs to navigate, the planning module A6 reasons systematically about the different possible outcomes of different ego manoeuvres (i.e. manoeuvres which the AV planner A6 of the ego vehicle might take) in the encountered driving scenario. For example a manoeuvre may determine that the AV needs to travel from its present location (starting point SP) to a certain endpoint EP. The determined manoeuvre is supplied to the simulator A5 which generates a number of candidate paths as will be described, each associated with a computed bound on collision risk. The candidate paths may be returned to the planner A6 to select a suitable path to execute.

For example, the paths can be synthesised for each goal using a Rapidly Exploring Random Tree (RRT) model. A space of predicted paths (search space) is defined based on the reference location for each goal and the current location ro of the external vehicle. The search space is then randomly sampled (based on randomized input parameters), in order to determine the set of n paths, and a likelihood of each of those paths. To simulate n paths for each goal, the relevant parameters of the RRT are randomised n times to perform n appropriately based random searches of the search space. In the present disclosure, the probabilistic risk of collision along a given trajectory may be calculated, and used to rank the candidate trajectories by safety. This in turn provides the likelihood of each sampled path on the assumption that the external vehicle is more likely to take safer paths to execute the goal in question.

The approach described herein is based on probabilistic robotics, wherein environmental uncertainty is posed probabilistically in the form of occupancy grids. However, the present disclosure seeks to relax several assumptions. Firstly, the fact that collision probabilities are not independent from cell to cell in an occupancy grid representation is taken into account. Instead, the probability of collision at one cell is directly coupled to that at a nearby cell, via the latent variable of true object pose. Secondly, the grid representation is reconsidered and an alternative computational approach is adopted that allows paths and object shapes to be modelled in a continuous fashion, deferring approximations to a much later stage in the procedure.

A key contribution of the techniques described herein is a faster procedure for calculating integrals associated with the calculation of collision risk. This is achieved through the use of convolutions over boundary shapes. Given the shapes and uncertain location of obstacles in an environment, the problem is to estimate the risk of collision from taking a sequence of actions (i.e., traversing along a candidate path), given a description of the objects in the environment for a set of hypothetical paths. This risk can be posed in terms of the probability distribution for environment by the obstacles on the path swept by a moving robot during a specified time interval along that path.

Figure 12:
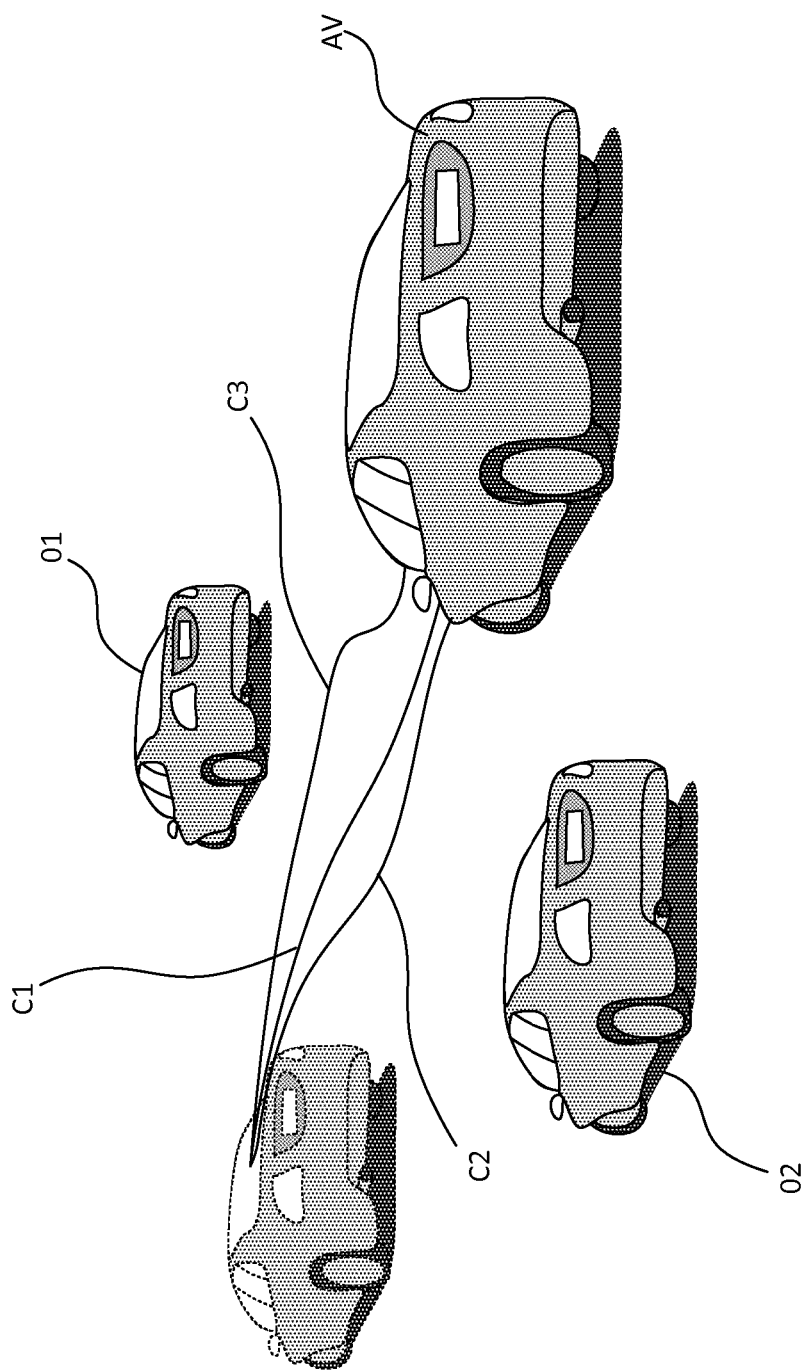
FIG. 12 is a visualisation of the motion planning problem for mobile robots.

FIG. 12 is a visualisation of the motion planning problem faced by a robot AV. The three curves represent possible paths C1, C2, C3 that the robot could traverse. The environment is represented by the two white cars $O_1$, $O_2$ whose position is known only up to probabilities, depicted by the distribution (over the centroids). The outcome of the computations is an assignment of risk of collision to each curve which defines a rank ordering (here C1 is most preferred and C3 is least preferred).

In the present disclosure it is assumed that freespace in the plane is defined deterministically, and that a robot of known shape translates and rotates in freespace. In addition, discrete "tethered" obstacles k=1 ..., K of known shape and uncertain location are introduced. The problem is then, over a (short) time-interval t∈[0, ..., T] to:

Generate N hypothetical paths in configuration space for the robot.

Bound the probabilistic risk of collision, for each path: a bound $F_D$ is computed on the risk of collision for each path. The FPR algorithm introduced here computes a bound $F_D$ on risk of collision, which is then available for use in motion synthesis. Its computational complexity is O(N+K), compared with the O(NK) of earlier techniques.

The following inputs to the risk computation are assumed:

Freespace: it is assumed that freespace F is defined to be a subset of $\mathfrak{R}^2$. Then within F, obstacles are defined stochastically as below.

Robot: assumed to have a deterministic spatial extent and to be manoeuvrable in translation and rotation. Over the interval t∈[0, ..., T], it sweeps out the set A in the plane of r=(x, y).

Obstacle shape: the k obstacle is assumed to have deterministic shape and mean orientation represented by the set $B_K$.

Tethered obstacle: tethering here means specifying a probability distribution pk(r) for the location of the $k^{th}$ obstacle, taking into account: i) variability arising from any possible motion over the time-interval [0, ..., T]; and ii) modelled uncertainty in object detector output. Obstacle locations are assumed to be mutually independent—arising from independent sensor observations.

Obstacle rotation: treated as part of its shape so, to the extent that an obstacle may rotate over the time interval [0, ..., T], that rotation must be absorbed in a deterministic expansion of the set $B_K$.

This treatment of obstacle rotation is a limitation of the framework described herein which, however, is reasonable if the time interval [0, ..., T] is short, so rotation is limited.

The Probabilistic Obstacle Framework: Laugier's Model

Consider an environment consisting of a set of K obstacles. These obstacles are typically detected by perceptual modules whose outputs are uncertain, hence we treat them as probabilistic. The position of each obstacle centre (or suitable canonical point, with respect to which all geometric computations can be reframed) is a random variable given by the density function $p_K(r)$, where r=(x, y) ∈$\mathfrak{R}^2$ The probability of collision between the robot and the kth obstacle (which we will sometimes write as 'obstacle k'), if that obstacle were a point obstacle, could be written as $$P_D(k) = \int_A p_k(r) \quad \text{(Equation 1)}$$

where A is the swept area of the robot, along a path π and over time t∈[$0_1$, $T_2$].

Now the total probability of collision is computed using the techniques of the Laugier et a paper reference earlier as $$P_D = 1 - \prod_{k=1}^{k} (1 - P_D(k)).$$

which must be recomputed for each swept path A of N hypothesised paths. However, when $P_D \ll 1$, as expected in practical, relatively safe situations, $P_D$ can be bounded by a close approximation, $P_D \leq F_D$ where $$F_D = \Sigma_{k=1}^{K} p_D(k) \qquad \text{(Equation 3)}$$

The inventors have perceived that the computation of $F_D$ in equation 3 can be made more efficient, i.e., of order O (1), by factoring it as:

$$F_D \leq \int I_A(r) G(r) \text{ where } G = \Sigma_{k=1}^{K} p_k(r) \qquad \text{(Equation 4)}$$

where $I_A$ denotes the indicator function for points belonging to the set A. The computation is O (N+K), not O (NK) since G can be precomputed and re-used for all hypothesised paths A. Most obstacles are not mere points. When an obstacle has a shape, $B_k \subset$, situated at the origin, then at position r' the displaced object would be described as $$B_k(r) = B_k + r = \{r + r', r'\} \qquad \text{(Equation 5)}.$$

Figure 2:
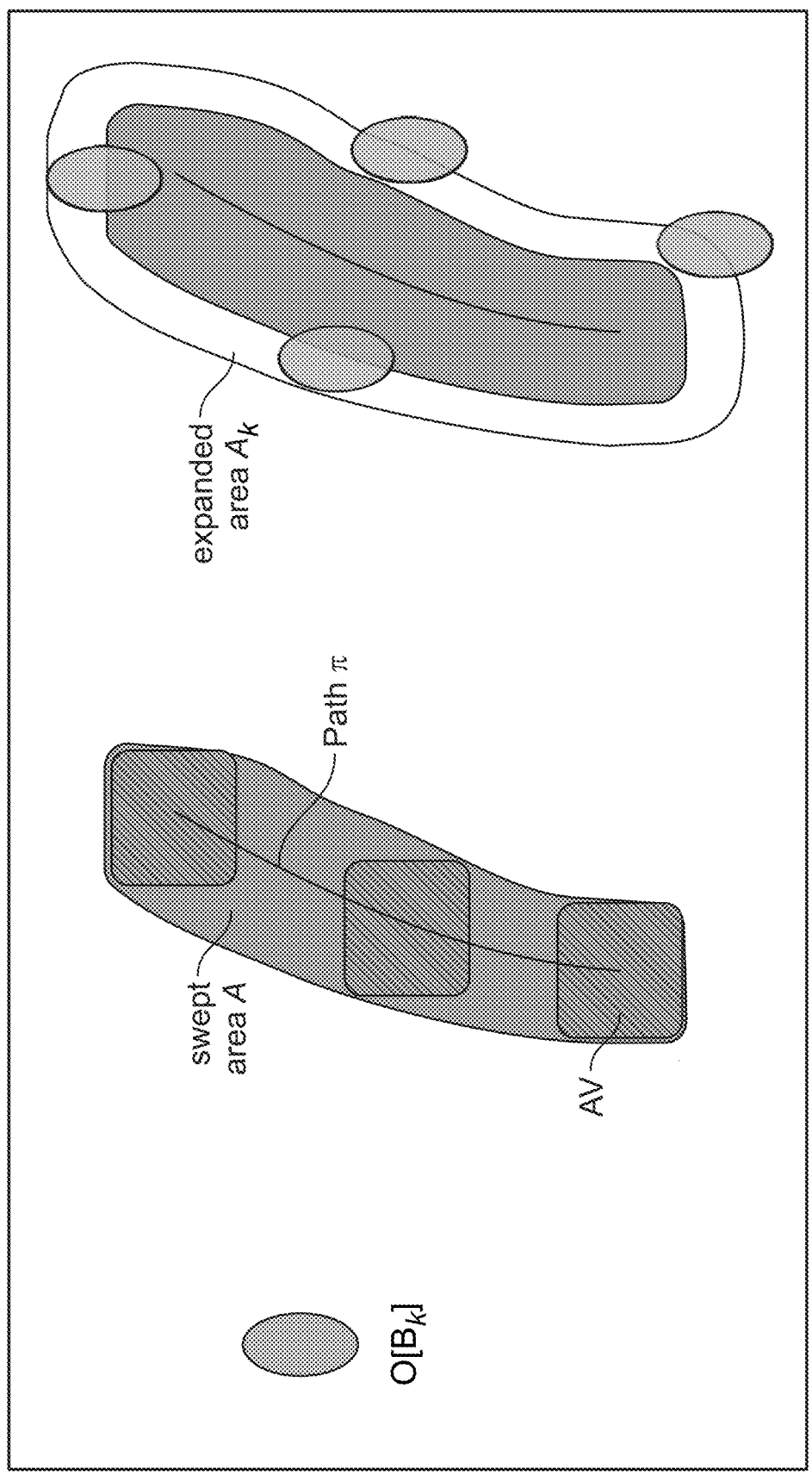
FIG. 2 is a diagram illustrating a Minkowski Sum showing a path π with swept area A, dilated by Minkowski sum with obstacle of shape $B_K$, to give the expanded swept area $A_K$.

So, the probability of collision with the obstacle may be rewritten as $$P_D(k) = \int_{A_k} p_k(r) \qquad \text{(Equation 6)}$$

where $A_k = A \oplus B_k$, the Minkowski sum of the robot shape and the obstacle shape, as in FIG. 2.

In prior search based planning algorithms, the Minkowski sums for $A_K$ must be recomputed for each new path A that is conjectured, and for every obstacle, $B_K$. This becomes inefficient when K, the number of obstacles, is large. In the present disclosure, there is presented a way to replace these repeated O (K) computations by an O (1) computation.

Minkowski Sum and the "Convolution Trick"

Note that the integral in Equation 6 can be rewritten as the convolution of two functions, evaluated at the origin, $$P_D(k) = [I_{A_k} * \tilde{p}_k(r)](0) \qquad \text{(Equation 7)}$$

where f˜ denotes the reflection of a function, i.e., f˜(r)=f(−r), and where the notation [ . . . ](r) means that the function defined in square brackets is evaluated at the location r. (So in this instance (7), the function in square brackets is a convolution of two functions, and is applied at the origin r=0.)

The inventors have noted that a connection between the Minkowski sum of two sets, and the convolution operator*applied to the indicator functions of the two sets may be used to advantage in this context. The connection is laid out in Equation 8.

$$Z = X \oplus Y \Rightarrow Z = \text{supp}(I_X * \tilde{I}_Y) \qquad \text{(Equation 8)}$$

where supp(f) is the support of the function f. In particular, $$A_k = \text{supp}(I_A * \tilde{I}_{B_k}) \qquad \text{(Equation 9)}$$

Figure 3:
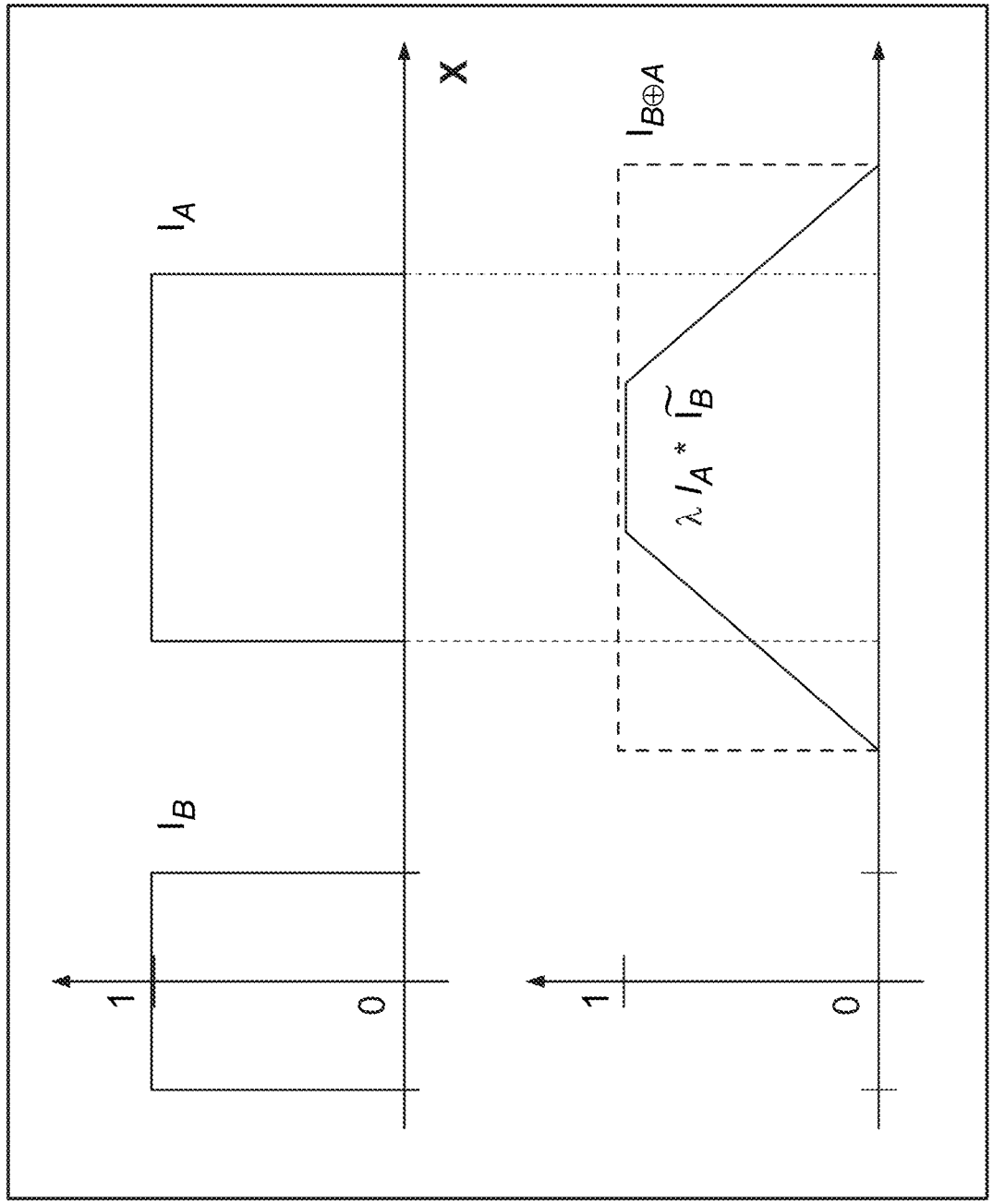
FIG. 3 are graphs illustrating convolution and the Minkowski sum.

In general, it need not be the case that the indicator of a Minkowski sum is simply (proportional to) the convolution of the two indicator functions (see FIG. 3), but over a restricted portion of the plane—corresponding to the case when the obstacle $B_K$ lies inside the robot path A, the following equality holds, $$I_{A_k}(r) = \lambda_k [I_A * \tilde{I}_{B_k}](r), \text{ when } B_k(r) \subset A \qquad \text{(Equation 10)}$$

where $$\lambda = \frac{1}{\text{area}(B_k)}.$$

The expression on the right of this equation is everywhere positive as it is a convolution of indicator functions which are positive.

This provides a formula for calculating $I_{A_k}$ when $B_k(r) \subset A$. The following sets out a corresponding calculation for the case when $B_k(r) \not\subset A$.

Using contours to bound the integral.

The complementary component of the Minkowski sum, $I_{A_k}$ can be bounded using a convolution of using the bounding contours of the obstacles, $\partial B_K$, and of the robot, $\partial A_K$, to obtain an upper bound on any integral of the form $\int_{A_k} f(r)$, and in particular on the collision probability in Equation 2.

Given the set A, the delta function ridge around its boundary $\partial A$ is calculated as, $$\partial A_\sigma(r) = |\nabla g_\sigma(r) * I_A(r)| \qquad \text{(Equation 11)}$$

where $g_\sigma$ (r) is a normalised isotropic 2D Gaussian function with a (small) diameter σ. Similarly, $\partial B_{(l,\sigma)}(r)$ is defined as the delta function ridge around $\partial B_K$. Now, the indicator function for the Minkowski sum is bounded in the complementary condition, and in the limit that σ→0, by the convolution of the two delta function ridge functions as follows, $$I_{A_k}(r) \leq \frac{1}{2}[\partial A_\sigma * \widetilde{\partial B_{k,\sigma}}](r), \text{ when } B_k(r) \subset A \qquad \text{(Equation 12)}$$

Figure 4:
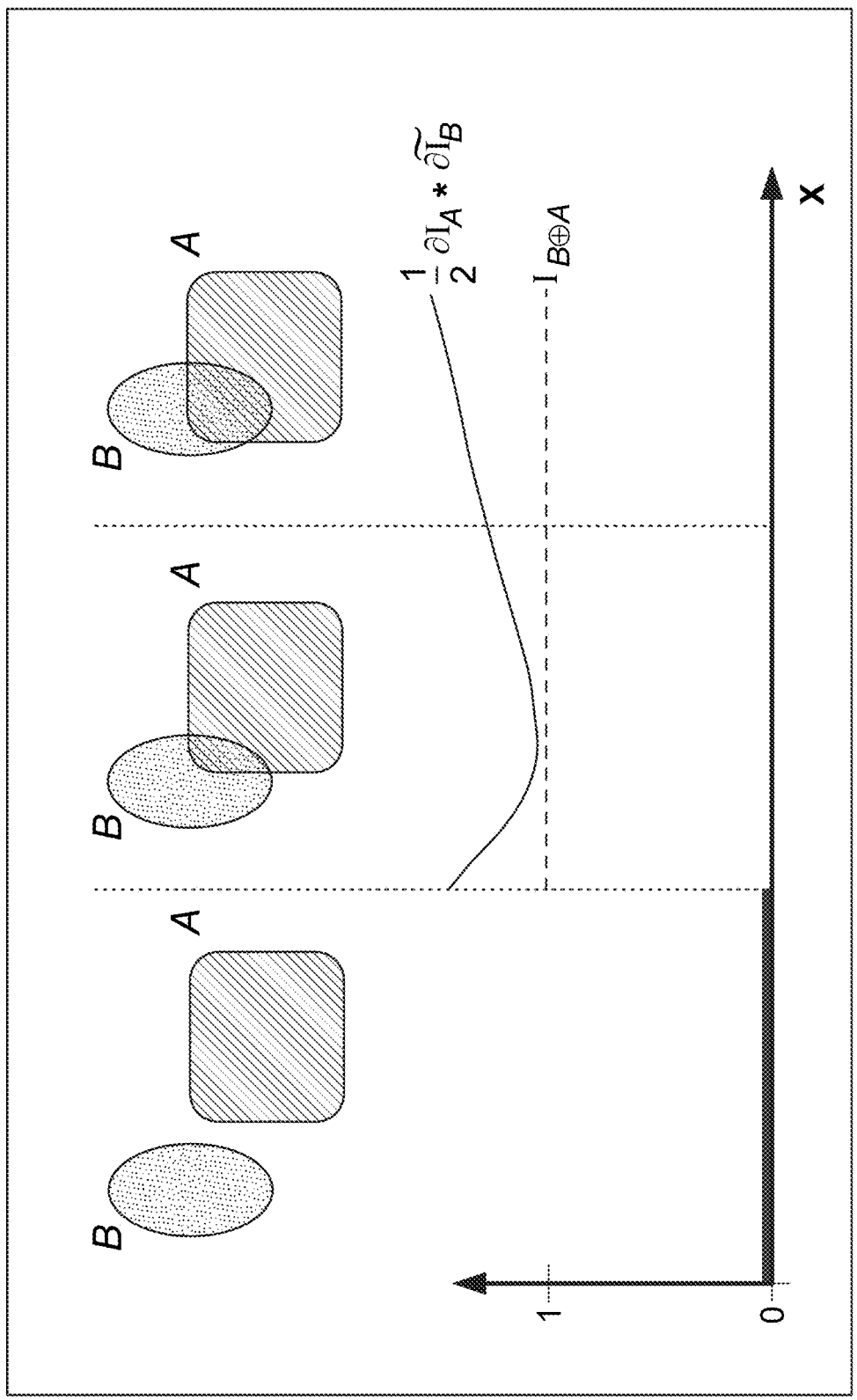
FIG. 4 is a graphical representation of a contour convolution in which the indicator function of the Minkowski sum of sets A and B is approximated via contour convolution.

This is illustrated in FIG. 4 which is an illustration in 1D of the fact that the indicator of a Minkowski sum is not generally equal to the convolution of the two indicators, but they do share the same support.

As with equation 10, the right hand side of the inequalities in 12 is everywhere positive. So, now the complementary expressions in Equations 10 and 12 can be combined into a single bound on the indicator function of the Minkowski sum, $$I_{A_k}(r) \leq \frac{1}{2}[\partial A_\sigma * \widetilde{\partial B_{k,\sigma}}](r) + \lambda_k[I_A * \tilde{I}_{B_k}](r) \qquad \text{(Equation 13)}$$

As this bounds holds everywhere, we may write, $$I_{A_k} \leq \frac{1}{2}[\partial A_\sigma * \widetilde{\partial B_{k,\sigma}}] + \lambda_k[I_A * \tilde{I}_{B_k}] \qquad \text{(Equation 14)}$$

Returning to the earlier expression for the collision probability, in equation 2, $$P_D(k) \leq [[\frac{1}{2}[\partial A_\sigma * \widetilde{\partial B_{k,\sigma}}] + \lambda_k[I_A * \tilde{I}_{B_k}]] * \tilde{p}_k](0) \qquad \text{(Equation 15)}$$

Using the associativity of the convolution operator, this may be rewritten as, $$P_D(k) \leq [\frac{1}{2}[\partial A_\sigma * \widetilde{\partial B_{k,\sigma}} * \tilde{p}_k](0) + \lambda_k[I_A * \tilde{I}_{B_k} * \tilde{p}_k](0)] \qquad \text{(Equation 16)}$$

Finally, $$P_D(k) \leq \int \partial A_\sigma \frac{1}{2}[\partial B_{k,\sigma} * p_k] + \int I_A[\lambda_k I_{B_k} * p_k] \qquad \text{(Equation 17)}$$

Summing up over obstacles, the bound on number of collisions is, $$F_D \leq \int \partial A_\sigma(r) G_\sigma(r) + \int I_A(r) G(r) \qquad \text{(Equation 18)}$$

where $G_\sigma = \frac{1}{2} \Sigma_k \partial B_{k,\sigma} * p_k$ and $G = \Sigma_k \lambda_k I_{B_k} * p_k$.

Note that G and $G_\sigma$ are independent of A and do not need to be recomputed every time A changes. So, the repeated computation of the bound (Equation 18) for N different swept paths A would indeed have complexity be O(N+K). That is, the path computations are independent of the number of obstacles—once the initial calculations of G and Gσ have been carried out. The above "convolution test"

gives a Fast Path Risk (FPR) method to calculate the bound on the number of collisions, summarised in Algorithm 1. (Shown in Annexe A).

Proof of the "Contour Convolution Trick"

That the indicator function for the Minkowski sum (in the limit that σ→0), in the inequality of Equation 10, is indeed bounded can be shown as follows $$I_{A_k}(x) \leq \frac{1}{2} [\partial A_\sigma * \widetilde{\partial B_{k,\sigma}}](x) \qquad \text{(Equation 19)}$$

In the case that $B_K(x) \cap A = \phi$, both sides of equation 17 are 0. Elsewhere, and given that $B_K(x) \subset A$, the contours of A and $B_K$ must intersect at least twice. In that case, $$[\partial A_\sigma * \widetilde{\partial B_{k,\sigma}}](x) = \int_{x'} \partial A_\sigma(x') \partial B_{k,\sigma}(x-x') \qquad \text{(Equation 20)}$$

integrates across two or more contour intersections, and the integral at each intersection (contours crossing at an angle θ) has the form, $$\int\int g_\sigma(x) g_\sigma(x\cos\theta + y\sin\theta) dxdy = \frac{1}{\sin\theta} \geq 1 \qquad \text{(Equation 21)}$$

In the limit when σ→0, since the indicator function $I_{AK}$ (x) has value 1 whenever the contours intersect, the formula 17 does indeed hold.

Figure 11:
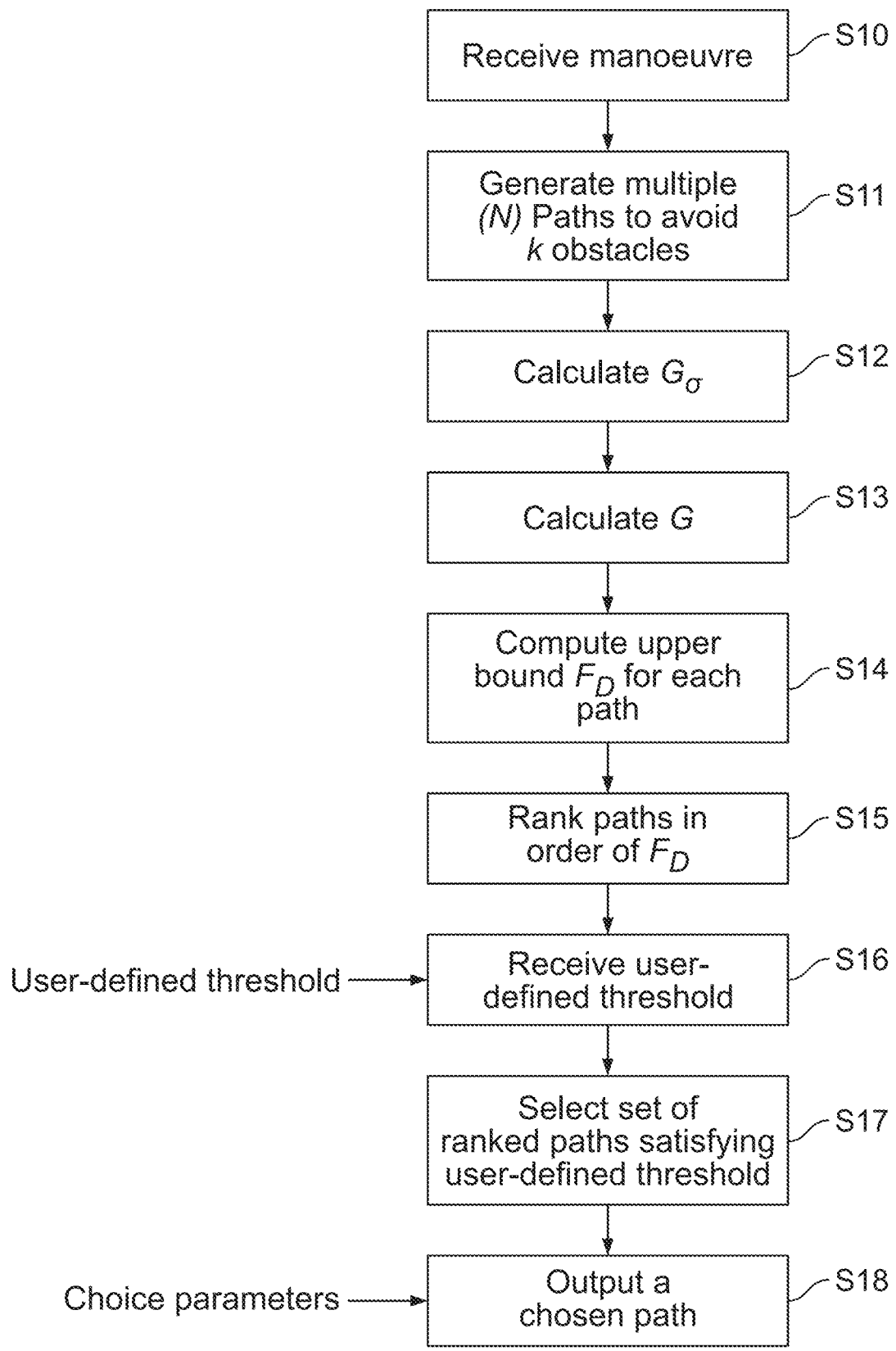
FIG. 11 is a flow chart of a path planning method.

FIG. 11 is a flow chart illustrating a planning method comprising various aspects described herein. At step S10 a manoeuvre is received from the planner A6. Multiple paths are generated to avoid K obstacles at step S11 eg. by an RRT algorithm. Factors Gσ and G are calculated across all obstacles. Although these are shown in order S12, S13, it will readily be appreciated that they could be calculated in a different order, or indeed simultaneously (as they are not interdependent). At step S14 the upper bound $F_D$ is computed for each path using equation 18. In each computation for each path, the same value of Gσ or G is utilised for the obstacles which have been detected for this set of candidate paths. At step S15 the paths are ranked in order of the computed upper bound. The ranked paths may be returned from the simulator to the planner. A user-defined threshold is received at step S16. This user-defined threshold may be a threshold on an acceptable level of primary risk, and may therefore set a certain value of $F_D$ below which paths are considered not safe enough. At step S17 a set of ranked paths is selected which satisfy the user-defined threshold. At step S18 on operating path is chosen from the selected set of ranked paths, using a path selection parameter, for example comfort or efficiency.

The ability to receive a user-defined threshold on primary risk opens up many useful possibilities. An externally defined threshold of risk may be applied and candidate paths (across all obstacles) which do not satisfy that level of risk may be deselected. This enables for example a regulatory or insurance body to apply a threshold of safety, and the techniques described herein ensure that can be met in the path planning. It further enables candidate paths which have not been deselected to remain available such that other path selection parameters can be utilised, for example comfort or efficiency as mentioned. This provides a convenient way of handling the potential difficulty of optimising both for a primary risk (collisions) and other nevertheless important factors. This has a number of possible applications.

For example, on-board sensors are responsible for detecting the environment and providing sensor data which is supplied to object detection algorithms. Object detection or recognition may be hampered by a number of aspects for example, it is possible that accuracy of recognition may differ between different object classes. Put simply, some objects may be more reliably detected than others. The present approach enables an operating path to be selected from candidate paths which achieves a minimum level of safety for all object recognition classes regardless of their accuracy. It may be that in path planning the robot can avoid collisions with obstacles in certain object classes at a higher level of safety (due to increased accuracy of detection for example), but at least a minimum level of safety is guaranteed across all object classes.

Shape models for obstacles have been mentioned earlier. One way of determining the shape of an obstacle is to access a shape model for that kind of obstacle. For example, if the obstacle has been identified as a vehicle, a shape model may be a rectangle or ellipse of certain dimensions. According to another example, pedestrians (and other small moving objects) may be modelled as zero dimensional shapes. Note that this does not mean they become invisible with respect to the planning, but are mathematically treated as a zero dimensional shape. In effect, they have been reduced to point obstacles.

Another way of determining the shape would be to use the object recognition algorithms to actually determine a particular shape for each obstacle. This is likely to be more complex but the techniques described herein could also be used in such a circumstance.

Experiments have been carried out to demonstrate that sets of randomly generated trajectories, for a particular environment configuration, can be efficiently labelled by the FPR algorithm, according to the bound $F_D$ on the risk of collision for each path. The FPR algorithm is agnostic as to the motion planner used to synthesise the candidate trajectories and is generally compatible with state of the art methods for motion planning (as outlined for example in C. Katrakazas, M. Quddus, W.-H. Chen, and L. Deka, Real-time motion planning methods for autonomous on-road driving, Transportation Rsch Part C: Emerging Technologies, 60, 416-442, 2015. A Closed Loop variant CL-RRT of the RRT algorithm is used to generate hypothetical paths in the environment, draw from the kinodynamicmodel for a particular robot. See for example Y. Kuwata, J. Teo, G. Fiore, S. Karaman, E. Frazzoli, and J. P. How, Real-time motion planning with applications to autonomous urban driving, IEEE Trans. Control Systems Tech., 17, 5, 1105-1118, 2009 and S. M. LaValle, Rapidly-exploring random trees: A new tool for path planning, Tech Rep., 1998. This has the advantage of generating typically smooth paths, that are plausible paths for that robot. Then the risk bound is calculated for each generated path.

First the results demonstrate the FPR algorithm for three simulated environments, then for a real environment taken from an aerial view. In each case, higher risk paths take tighter lines around obstacles, as would be expected. The experiments show: i) how close the bound on risk is to the true risk; and ii) that the use in FPR of the "convolution trick", which improves computational complexity from O(NK) to O(N+K) as explained earlier, leads to substantial reductions in practical computation times.

Simulated Environments

Figure 5A:
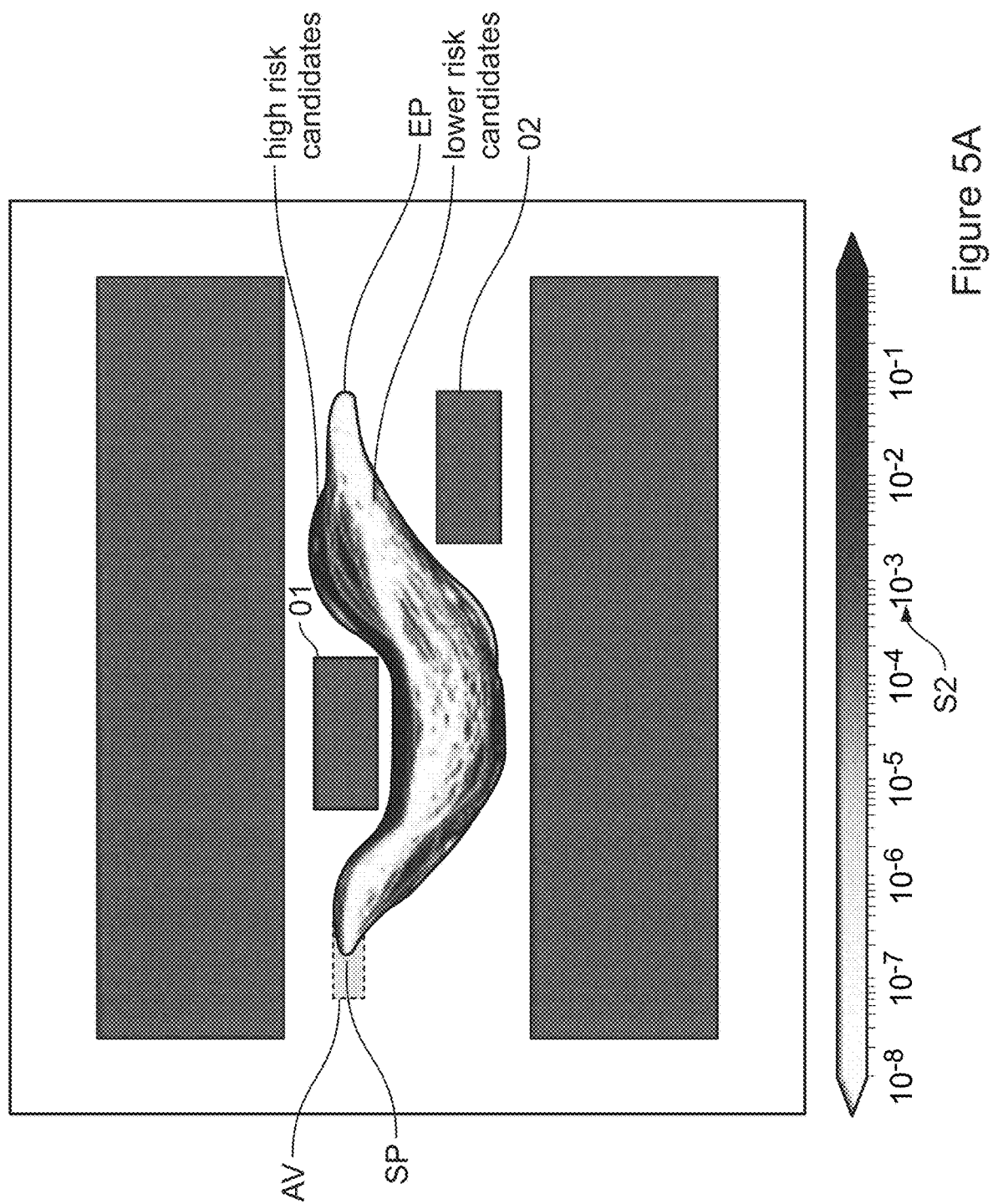
FIGS. 5A and 5B illustrates visualisation of paths for two different simulated.
Figure 5B:
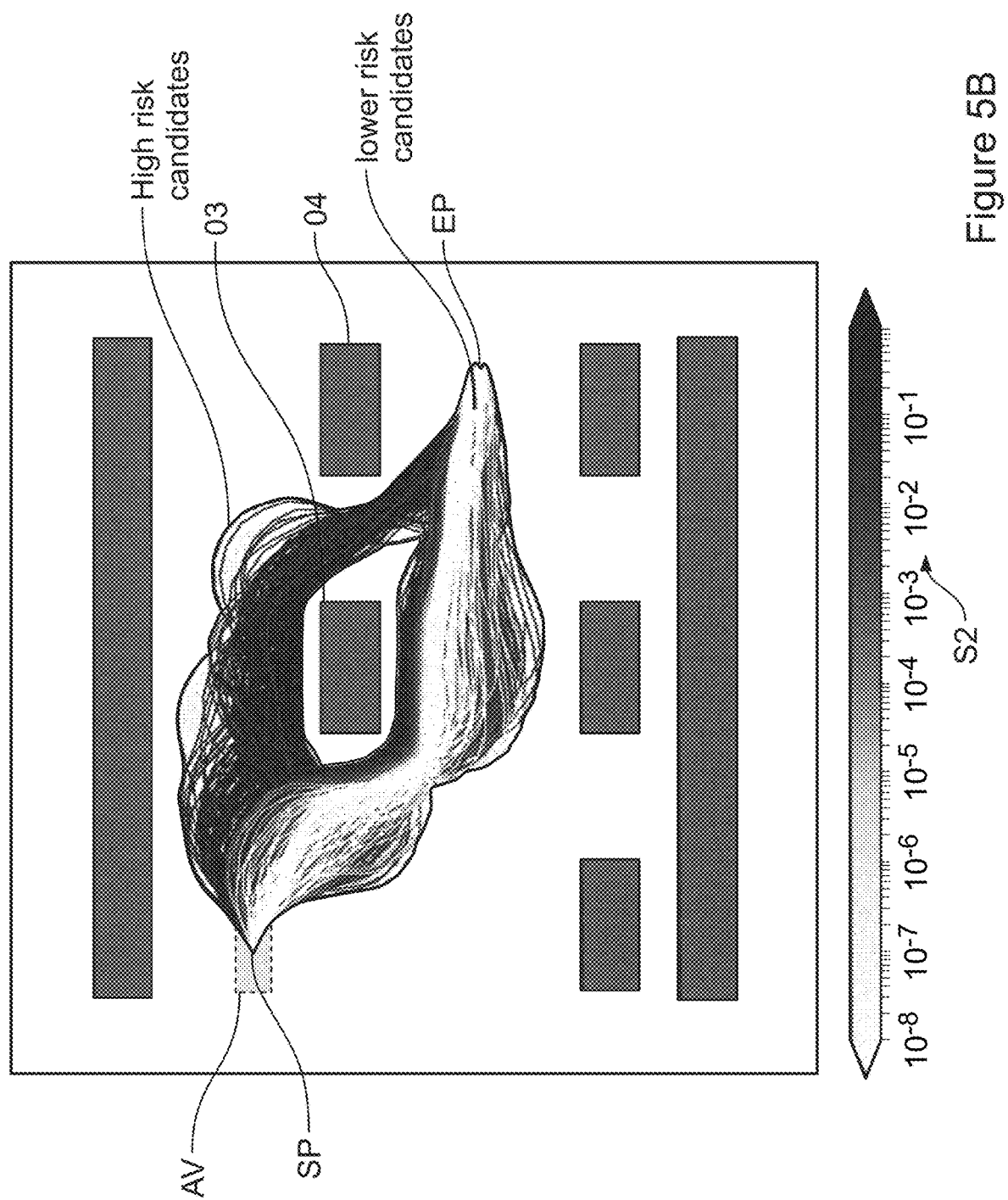
Figure 6:
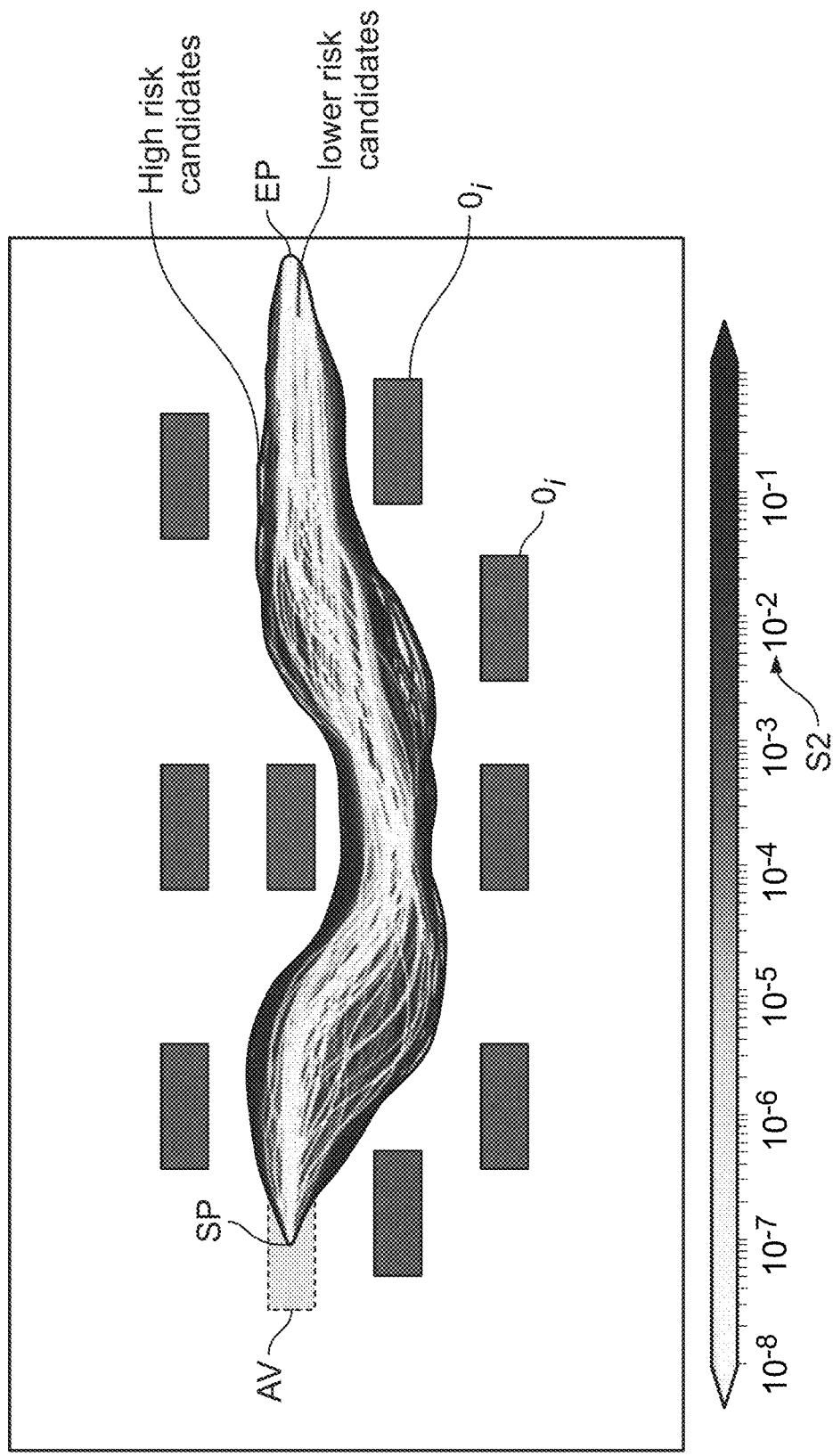
FIG. 6 illustrates visualisation of paths in an environment with more obstacles.

In the experiments, a 2D simulation is used in which a rectangular robot of size 2 m×4 m navigates along continuous paths, defined as the progression of full pose over time (though visualisations only depict the centroid). A simulation scenario is defined as a collection of obstacles within the environment, each specified as a shape (a subset of 2), and pose, together with positional uncertainty, as well as start and target poses for the ego vehicle. The three simulated scenarios used here resemble sections of a car park: two each with just two car as obstacles (FIGS. 5A and 5B), and a third with a more complex arrangement (FIG. 6). In each case, 400 paths are generated at random by CL-RRT. The uncertainty over each obstacle's position is modelled as a two-dimensional Gaussian distribution with standard deviation 30 cm, which is 15% of each obstacle's width. FIGS. 5A and 5B show paths for two different simulated environments. A set of candidate paths are generated with fixed start SP and end poses EP. The dark objects are obstacles, O1. O2 etc. whose position is known with an uncertainty visualised here as a shaded halo. Risk bounds $F_D$ on each path are represented by different shades of grey, on the logarithmic scale S2 shown. Safer paths maintain greater clearance around obstacles as expected. Some risky paths involve squeezing through a narrow gap. In the second scenario (FIG. 5B), the robot AV is able to squeeze through a narrow gap, but at some considerable risk of collision. In FIG. 6, a more complex environment is shown with more obstacles $O_i$, and again higher values of the bound $F_D$ on the risk of collision correspond to tighter clearances.

FIG. 6 shows paths with varying values of $F_D$, with tighter clearances when the bound $F_D$ on collision risk is high. Risk bounds are shown on same scale as FIG. 5.

Real Aerial Data

Figure 1:
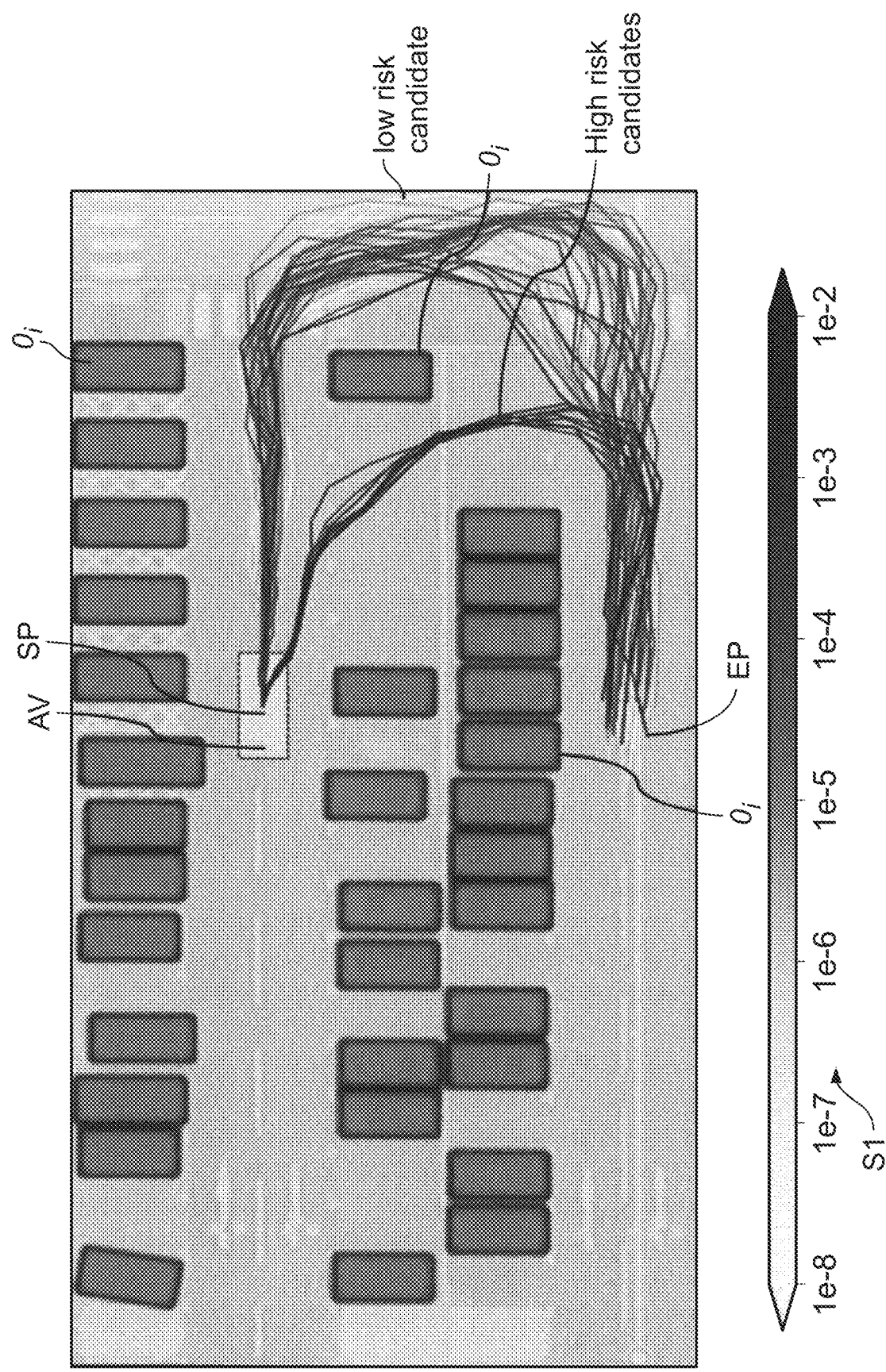
FIG. 1 is a representation based on data taken from an aerial view of a car-park illustrating the robot planning problem, with trajectories shown in shades of grey according to risk of collision.

In FIG. 1 an aerial view of a car park is shown, with a set of candidate paths for the robot AV generated by CL-RRT, between fixed start and end points. Obstacle vehicle shapes $O_i$ are represented as bounding rectangles. The obstacles here are 35 cars with shapes given by the bounding boxes shown in a fixed line, and uncertainties in location visualised as a slightly darker "fuzzy" halo around each bounding box. The robot vehicle AV has a set of candidate paths, evaluated here as high risk (dark grey) to low risk (white) according to the scale shown. Bounds on collision risk are represented by different shades of grey as on the logarithmic scale S1 shown. Some higher risk paths involve squeezing through a narrow gap. Error in estimated position of the obstacle-cars is Gaussian with standard deviation of 0.3 m. The candidate paths are shown in different shades of grey according to the computed value of the bound on collision risk. This turns out to include safer paths with collision risk down to $10^{-5}$ and below, and riskier paths, above $10^{-2}$ risk of collision, that involve squeezing through a narrow gap.

Performance Evaluation

Figure 7:
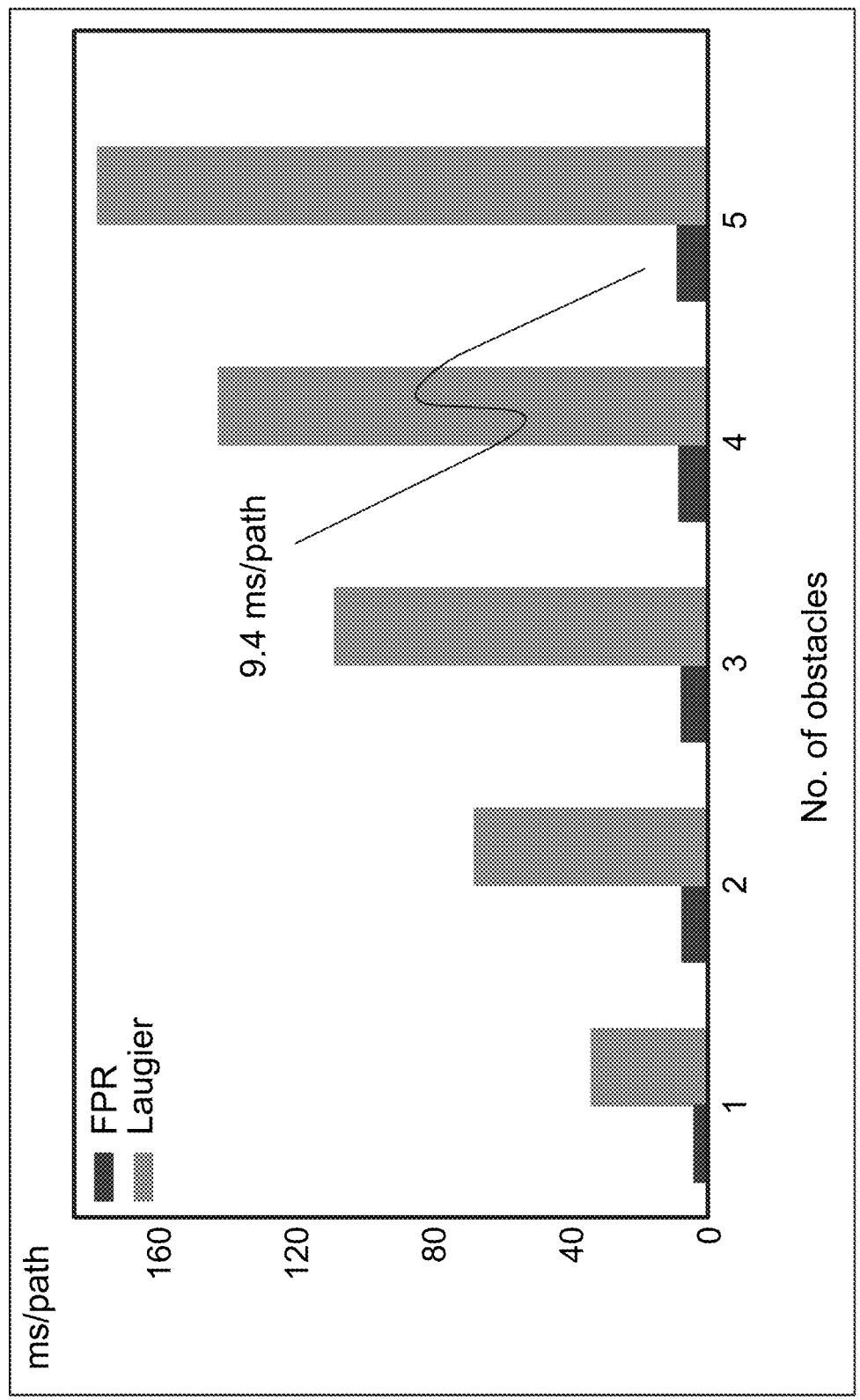
FIG. 7 is a graph comparing the complexity and performance of the FPR (Fast Path Risk) computation described herein of the bound $F_D$ on collision risk, using the car park data from FIG. 1, with a Laugier computation.

Experimental results given here illustrate the computational benefits of the FPR approach for evaluating bounds on risk. In FIG. 7, empirical data is presented regarding the computational complexity of the present method compared to the baseline of computing the integral in Equation 6) directly. FIG. 7 shows that computing the FPR bound on risk is significantly faster than exact computation via Laugier integrals. This is true in absolute terms, thanks to the use of efficiently implemented convolution, in place of Minkowski sum. It is also true in complexity, giving almost constant computation time with respect to the number K of obstacles, cf. linear growth. In absolute terms, even for one obstacle, average runtime is 9 times faster for FPR, owing to the use of efficiently implemented convolution in place of Minkowski sum. Then for increasing numbers of obstacles, runtime becomes almost constant with the number of obstacles at 9.4 mc/path, cf. linear growth for direct computation of the Laugier integrals (6) for each obstacle. This is consistent with O(N+K) complexity c.f O(NK) complexity (for N evaluated paths), as expected from the theory outlined above.

A consideration of how tight is the bound on collision risk.

The FPR algorithm computes the bound $F_D$ on the exact risk $P_D$ computed as in (Equation 2) and (6). The slack in the bound is evaluated in several situations to see how close the bound is in practice.

Consider the simplest interesting situation with one square robot and an identical square obstacle, at various relative orientations and distances (from 0.75 of a square diameter up to 1.75 diameters), and where p1(r) is Gaussian with s.d. of 0.25 of a square diameter.

Statistics are averaged over al the paths in the car-park data, representing the car-obstacle shapes Bk as rectangles.

Figure 8:
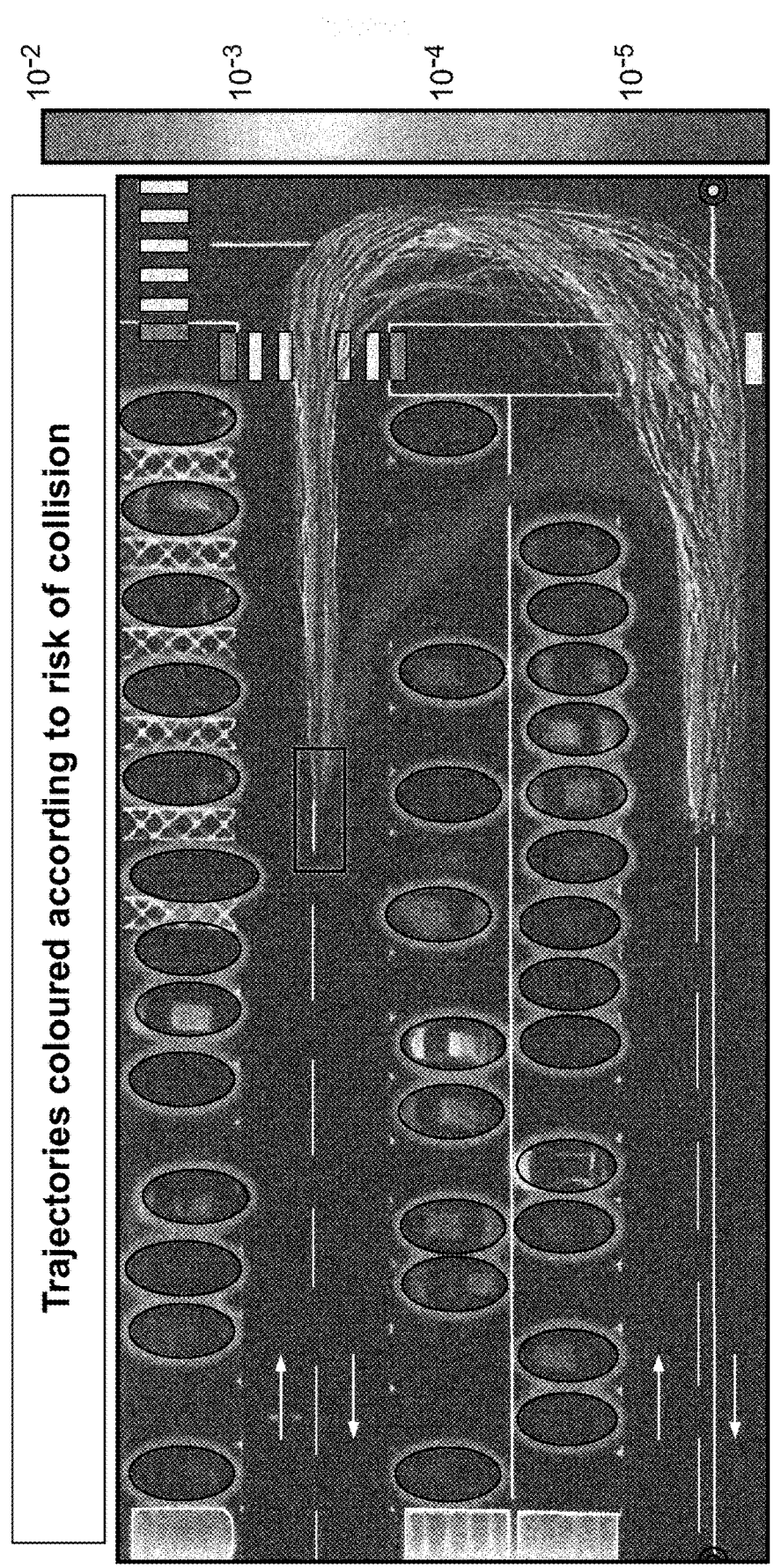
FIG. 8 is a representation of data from an aerial view of the car-park with the vehicles represented as elliptical shapes.

The rectangle shapes above are replaced with bounding ellipses, as in FIG. 8. Bounds $F_D$ on collision risk are calculated here using elliptical rather than rectangular bounding shapes for the obstacles. This produces tighter bounds, so risk values $F_D$ are generally lower than for FIG. 1.

Figure 9:
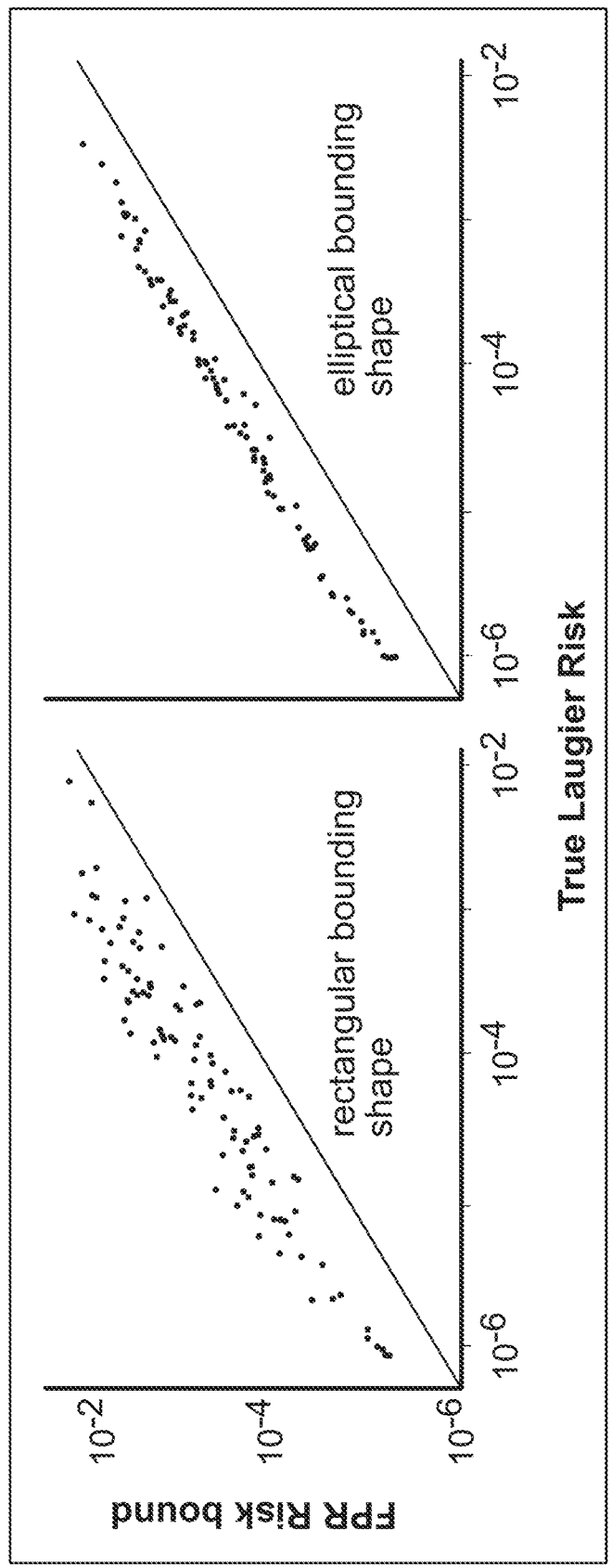
FIG. 9 is a plot of bounds on collision risk plotted for elliptical and rectangular bounding obstacle shapes in the car-park data of FIGS. 1 and 8.

For the two squares, the bound is quite tight, ceding a factor of just 1.9 in risk on average. For the car park, the bounds are rather loose, with a factor of 8.9 of slack on average. When ellipses are used in place of rectangles, the slack is tightened to a factor of 4.7 on average. These slack factors occur more or less uniformly at high and low risk, as FIG. 9 shows. In FIG. 9, bounds $F_D$ on collision risk are plotted for elliptical and rectangular bounding obstacle shapes. Risk bounds have, on average, a factor of up to an order of magnitude slack for rectangular shapes, and that is true both at low and high risk. Bounds are tighter for elliptical obstacle shapes. One reason on why the bound is slacker for rectangles than ellipses is because configurations in which the robot rectangle is almost tangential to an obstacle rectangle occur frequently, causing a spike in the contour-convolution (see FIG. 4). This effect is abated when the bounding obstacle shapes are ellipses, since extended tangency is avoided.

Implementation Details

As described above, an augmented version of the CL-RRT planner, with probabilistic sampling is used in the above examples, similar to other approaches for heuristically biasing RRT growth as described for example in C. Urmson and R. Simmons, *"Approaches for heuristically biasing rrt growth"*, in IEEE Int. Conf. IROS, 2, 1178-1183, 2003. Tree nodes are chosen for expansion according to their scores. It discretises steering and accelerator input ranges when expanding the random tree, to generate realisable trajectories, and in order to restrict abrupt steering or velocity changes. Nodes in the RRT are scored based on their proximity to the goal, and similarity to its orientation and velocity. The $k^{th}$ tethered obstacle is made deterministic, for the purposes of CL-RRT, taking the shape Bk at the mean location over pk. Throughout the experiments freespace is discretized on a grid with a resolution of 5 cm/px. The constant for Gaussian convolution, σ=1 grid square, is just big enough for good numerical behaviour. All of the numerical computations are implemented using the GPU-enabled Python module for linear algebra CuPy.

The approach described herein to safe motion planning bounds the risk of collision for candidate paths in configuration space. An acceptably safe path is then taken to be one that satisfies $F_D \leq \theta$, for some user-supplied threshold θ on risk. The FPR algorithm builds on a probabilistic framework for calculating collision risk, and uses the convolution trick to render these computations in linear time in N and K. Amongst trajectories deemed safe enough, there is then freedom to optimise for other criteria such as rider comfort and travel time. At the hardware level, the on-board computer system A1 of the AV comprises execution hardware capable of executing algorithms encoded in software (computer programs) to carry out the above functions. Whilst the execution hardware can be general purpose or special purpose execution hardware, or any combination thereof, it will generally comprise one or more processors such as central processing units (CPUs) and which may operate in conjunction with specialized hardware such as, but not limited to, accelerators (e.g. GPU(s)), field programmable gate-arrays (FPGAs) or other programmable hardware, and/or application-specific integrated circuits (ASICs) etc. Given the need to perform complex data processing operations, often using sophisticated and complex ML/AI models, with sufficient accuracy and speed (often in real-time) to ensure safe and reliable operation, the on-board computer system may be highly sophisticated, possibly with specialized computer hardware tailored to implement the models and algorithms in question. Particularly given the speed at which innovation is progressing in the field of AI, it will be appreciated that the architecture of the AV on-board computer system A1 at both the hardware level and the functional/software level may take numerous forms. Herein, functional components and the like embodied in a computer system—such as the data processing component A2, prediction component A4 and AV planner A6—are high-level representation of particular functionality implemented by the computer system, i.e. functions performed by whatever (combination of) general purpose and/or specialized hardware of the computer system that is appropriate in the circumstances. As noted, the invention also contemplates an off-board simulation environment where similar code may be executed on off-board computer hardware.

In the above description there are laid out various aspects of path planning for a mobile robot. The following steps are discussed. Not all of these steps need to be performed in an efficient computation as described earlier.

A computer-implemented method of evaluating different paths A of an object in the presence of K obstacles, comprising:
  determining, for each of the K obstacles, the shape $B_k$ and a density function $p_k(x)$ representing the position of said obstacle;
  repeating the following steps for at least two different paths A:
    choosing a path A, where A is the swept area of the object within a given time interval;
    calculating an upper bound on the total probability of at least one collision $F_D$ between the object and the K obstacles.

The method wherein a path A having the smallest $F_D$, preferably having $F_D=0$, is selected for navigating the object through the obstacles.

The method, wherein the step of calculating $F_D$ includes calculating an upper bound which is given by $$F_D \leq \int \partial A_\sigma(x) G_\sigma(x) + \int I_A(x) G(x)$$

where $\partial A_\sigma$ is the bounding contour of the path A, $\partial A_\sigma$ approximates a delta-function ridge along that contour, and $G_\sigma$ as well as $G$ are functions which do not depend on A.

The method wherein the computational load for calculating the upper bound for all paths A after the first is independent of the number of obstacles.

The method wherein $G_\sigma$ is calculated as follows:

$$G_\sigma = \frac{1}{2} \sum_k \partial B_{k,\sigma} * p_k$$

where $\partial B_{k\sigma}$ is a delta-function ridge along the bounding contour of the shape $B_k$ of the obstacle k and $p_k$ is a density function representing the position of the obstacle centre.

The method wherein G is calculated as follows:

$$G = \sum_k \lambda_k I_{B_k} * p_k$$

where $\lambda_k = 1/\text{area}(B_k)$, $I_{B_k}$ is the indicator function of the shape $B_k$ of the obstacle k and $p_k$ is a density function representing the position of the obstacle centre.

The method, wherein the shapes $B_k$ are zero-dimensional as a result of which the upper bound is given by $$\int I_A(x) G(x)$$

where $$G = \Sigma_k p_k.$$

The method wherein $F_D = \Sigma_{k=1}^K P_D(k)$ is calculated by calculating, for each obstacle, the probability of collision $P_D(k)$ between the object and said obstacle using the indicator function $I_{Ak}$ of the Minkowski sum $A_k = A \oplus B_k$ for said obstacle.

The method further comprising the step of determining, for each obstacle and each path A, whether its shape $B_k$ lies inside the path A.

The method further comprising the step of calculating the indicator function $I_{Ak}$ for an obstacle having a shape $B_k$ lying inside the path A using a convolution of the two indicator functions $I_A$ and $\tilde{I}_{Bk}$.

The method wherein the indicator function $I_{Ak}$ for said obstacle having a shape $B_k$ lying inside the path A is calculated as follows:

$$I_{A_k}(x) = \lambda_k [\partial I_A * \tilde{I}_{B_k}](x).$$

The method wherein an upper bound on the indicator function $I_{Ak}$ for an obstacle having a shape $B_k$ overlapping with the path A is calculated using a convolution of the boundary contours of said obstacle $\partial B_k$ and the path $\partial A$.

The method wherein the upper bound is calculated as follows:

$$I_{A_k}(x) \leq \frac{1}{2}[\partial A_\sigma * \widetilde{\partial B_{k,\sigma}}](x).$$

The method wherein an upper bound on the indicator function $I_{Ak}$ for each obstacle is calculated as follows:

$$I_{A_k}(x) \leq \frac{1}{2}[\partial A_\sigma * \widetilde{\partial B_{k,\sigma}}] + \lambda_k [I_A * \tilde{I}_{B_k}]$$

where $\partial B_k$ and $\partial A$ are the boundary contours of said obstacle and the path, respectively, $I_A$ is the indicator function of the path A, and $\tilde{I}_{Bk}$ is the indicator function of the shape $B_k$.

The method wherein the probability of collision $P_D(k)$ is the convolution of the indicator function $I_{Ak}$ of the Minkowski sum $A_k = A \oplus B_k$ for said obstacle and a density function $p_k(x)$ representing the position of the obstacle centre, evaluated at the origin.

Annexe 1

Algorithm 1: FPR algorithm for the bound on collision risk given N paths, and K obstacles.

Data: N instances of path A, $B_{1:K}$, $p_{1:K}(r)$, $\sigma = 1$
Result: $F_D$
//Compute $G_\sigma$
for k in 1 to K do
    $\partial B_{k,\sigma}(r) = |\nabla g_\sigma(r) * I_{B_k}(r)|$
end
$G_\sigma(r) = \frac{1}{2}\Sigma_{k=1}^{K} \partial B_{k,\sigma}(r) * p_k(r)$
//Compute G
$G(r) = \sum_{k=1}^{K} \frac{1}{\text{area}(B_k)} I_{B_k}(r) * p_k(r)$
for each A do
    //Compute $\partial A_\sigma$
    $\partial A_\sigma(r) = |\nabla g_\sigma(r) * I_A(r)|$
    //Integrate over a box around A with margins $4\sigma$
    $F_D = \int_{\mathbb{R}^2} \partial A_\sigma(r) G_\sigma(r) + I_A(r) G(r)$
end

The invention claimed is:

1. A computer-implemented method of path planning a-path for a mobile robot in the presence of K obstacles where K is at least one, comprising:
determining, for each of the K obstacles, a shape Bk and a density function pk(x) representing probabilistic position of said obstacle;
repeating, for each potential path of at least two different potential paths:
determining a swept area A of the mobile robot along the potential path within a given time interval; and
calculating for the potential path, based on the density function of each obstacle and the swept area A, an upper bound $F_D$ on the total probability of at least one collision between the mobile robot and the K obstacles;
selecting, from the at least two different potential paths based on the upper bounds calculated for the at least two different potential paths, a path for navigating the mobile robot through the obstacles; and
based on the selected path, generating a mobile robot control signal.

2. The method according to claim 1 comprising ranking the at least two different potential paths based on the upper bound of the total probability of at least one collision.

3. The method according to claim 1, wherein a path having the smallest $F_D$, preferably having $F_D=0$, is selected for navigating the mobile robot through the obstacles.

4. The method according to claim 1 wherein the upper bound is further based on shapes of the K obstacles.

5. The method according to claim 1, further comprising the step of determining, for each obstacle and each path, whether the shape $B_k$ of the obstacle lies inside the swept area A.

6. The method according to claim 5, wherein the step of calculating the upper bound $F_D$ includes calculating the integral for the case when the shape $B_K$ lies outside the swept area $\int \partial A_\sigma(x) G_\sigma(x)$ where $\partial A_\sigma$ is a bounding contour of the swept area A, $\partial A_\sigma(x)$ approximates a delta-function ridge along that bounding contour, and $G_\sigma$ is a second term which does not depend on the swept area A.

7. The method according to claim 6, wherein $G_\sigma$ is calculated as follows:

$$G_\sigma = \frac{1}{2}\sum_k \partial B_{k,\sigma} * p_k$$

where $\partial B_{k\sigma}$ is a delta-function ridge along a bounding contour of the shape $B_K$ of the obstacle K and $p_k$ is a density function representing the probabilistic position of the obstacle at a canonical point in the obstacle.

8. The method according to claim 5, the step of calculating the upper bound for a case when the shape $B_K$ lies inside the swept area comprises computing the integral $\int I_A(x)G(x)$ wherein G is calculated as follows:

$G = \Sigma_k \lambda_k I_{B_k} * p_k$ where $Ak = 1/\text{area}(B_k)$, $I_{Bk}$ is an indicator function of the shape $B_k$ of the obstacle k and $p_k$ is a density function representing the probabilistic position of the obstacle at a canonical point of the obstacle.

9. The method according to claim 1, wherein each shape $B_k$ is modelled as zero dimensional and the upper bound is given by $\int I_A(x) G(x)$ where
$G = E_k p_k$ and $I_A(x)$ is an indicator function of the swept area A.

10. The method according to claim 1, wherein K>1, the method further comprising:
computing at least one path independent function as a combination of the density functions for the K>1 obstacles; and
for each of a plurality of candidate paths, determining the upper bound of the total probability of obstacle collision along that path, by integrating the path independent function over the swept area A of the mobile robot along that path within the given time interval;
wherein the path independent function is independent of the candidate path and the upper bound is computed for each candidate path without recomputing the path independent function.

11. The method according to claim 10, wherein the upper bound for each candidate path is an upper bound on a sum of individual obstacle collision probabilities along that path, but is computed without determining any of the individual obstacle collision probabilities, and instead, by integrating the path independent function over the swept area.

12. The method according to claim 10, wherein calculating the upper bound comprises computing an integral of the product of a first term depending on the swept area A of the path and the path-independent function, the path-independent function calculated in a initial calculation and the upper bound then computed using the calculated second term for each different path.

13. The method according to claim 10, wherein the path-independent function is determined as $$G_\sigma = \frac{1}{2}\sum_k \partial B_{k,\sigma} * p_k$$

where $\partial B_{k,\sigma}$ is a delta-function ridge along a bounding contour of the shape $B_K$ of the obstacle k and $p_K$ is the density function for the obstacle k; and
wherein the path-independent function $G_\sigma$ is integrated as
$\int \partial A_\sigma(r) G_\sigma(r)$ where $\partial A_0$ is the bounding contour of the swept area A and $\partial A_0(x)$ approximates a delta-function ridge along that contour.

14. The method of claim 10, wherein the path-independent function is determined as $$G = \tau_k \lambda_k I_{B_k} * p_k$$

where $$A_k = \frac{1}{\text{area}(B_k)},$$

$I_{B_k}$ is the indicator function of the shape Bk of the obstacle k and pk is the density function for the obstacle k;
wherein G is integrated as $$\int I_A(r) G(r)$$

wherein $I_A$ is the indicator function for the swept area A.

15. The method according to claim 10, wherein a first path-independent function is determined as:

$$G_\sigma = \frac{1}{2} \sum_k \partial B_{k,\sigma} * p_k$$

where $\partial B_{k,\sigma}$ is a delta-function ridge along a bounding contour of the shape $B_K$ of the obstacle k and $p_K$ is the density function for the obstacle k; and wherein the first path-independent function $G_\sigma$ is integrated as $\int \partial A_o(r) G_o(r)$, where $\partial A_0$ is the bounding contour of the swept area A and $\partial A_0(x)$ approximates a delta-function ridge along that contour;
and a second path-independent function is determined as:

$$G = \Sigma_k \lambda_k I_{B_k} * p_k$$

where $$A_k = \frac{1}{\text{area}(B_k)},$$

$I_{B_k}$ is the indicator function of the shape Bk of the obstacle k and pk is the density function for the obstacle k; wherein G is integrated as $\int I_A(r)G(r)$, wherein $I_A$ is the indicator function for the swept area A;
and wherein the path independent functions are integrated as follows in order to determine the upper bound:

$$\int \partial A_o(r) G_o(r) + I_A(r) G(r).$$

16. The method according to claim 1, wherein the K obstacles are identified using a perception module based on sensory input available to the mobile robot while mobile in its environment, or simulated sensory input.

17. The method according to claim 1, wherein the step of determining the shape $B_K$ comprises accessing a shape model for the obstacle.

18. A computer program product comprising instructions embodied in non-transitory media that, when the instructions are executed by a computer, cause the computer to perform a method of path planning for a mobile robot in the presence of K obstacles, where K is at least one, wherein each of the K obstacles has a shape model indicating a shape $B_K$ of the obstacle and a density function $P_K(x)$ representing probabilistic position of said obstacle, the method comprising:
repeating the following steps for each potential path of at least two different potential paths:
determining a swept area A of the mobile robot along the potential path within a given time interval; and
calculating for the potential path, based on the density function of each obstacle and swept area A, an upper bound $F_D$ on the total probability of at least one collision between the mobile robot and the K obstacles;
selecting, from the at least two different potential paths based on the upper bounds calculated for the at least two different potential paths, a path for navigating the mobile robot through the obstacles; and
based on the selected path, generating a mobile robot control signal.

19. A data processing system configured to path plan for a mobile robot and comprising:
a computer; and
memory holding instructions that, when executed by the computer, cause the computer to path plan for a mobile robot in the presence of K obstacles, where K is at least one, wherein each of the K obstacles has a shape model indicating a shape BK of the obstacle and a density function PK(x) representing probabilistic position of said obstacle, by:
repeating the following steps for each potential path of at least two different potential paths:
determining a swept area A of the mobile robot along the path within a given time interval; and
calculating for the potential path, based on the density function of each obstacle and swept area A an upper bound $F_D$ on the total probability of at least one collision between the mobile robot and the K obstacles;
selecting, from the at least two different potential paths based on the upper bounds calculated for the at least two different potential paths, a path for navigating the mobile robot through the obstacles; and
based on the selected path, generating a mobile robot control signal.

20. A data processing system according to claim 19 embodied in a simulator external to, or on board the mobile robot.

* * * * *